(12) United States Patent
Sekino et al.

(10) Patent No.: US 12,742,084 B2
(45) Date of Patent: Sep. 22, 2026

(54) AQUEOUS INK, INK CARTRIDGE AND INK JET RECORDING METHOD

(71) Applicant: CANON KABUSHIKI KAISHA, Tokyo (JP)

(72) Inventors: Katsutoshi Sekino, Kanagawa (JP); Satoru Kobayashi, Kanagawa (JP); Hiroshi Kakikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 137 days.

(21) Appl. No.: 18/394,383

(22) Filed: Dec. 22, 2023

(65) Prior Publication Data

US 2024/0218196 A1 Jul. 4, 2024

(30) Foreign Application Priority Data

Dec. 26, 2022 (JP) ................................ 2022-208958
Nov. 29, 2023 (JP) ................................ 2023-201741

(51) Int. Cl.
*C09D 11/322* (2014.01)

(52) U.S. Cl.
CPC ................................ *C09D 11/322* (2013.01)

(58) Field of Classification Search
CPC ................................ C09D 11/322
See application file for complete search history.

(56) References Cited

U.S. PATENT DOCUMENTS 5,345,254 A * 9/1994 Wong .................... C09D 11/30 347/100
6,779,884 B1 * 8/2004 Ma ........................ C09D 11/30 347/100
8,138,250 B2 * 3/2012 Hassan ................. D21H 19/46 427/393
8,845,085 B2 9/2014 Kobayashi et al.
8,939,570 B2 1/2015 Mori et al.
9,388,322 B2 7/2016 Kakikawa et al.
9,574,099 B2 2/2017 Kawabe et al.
9,738,803 B2 8/2017 Horiuchi et al.
9,809,721 B2 11/2017 Yamamoto et al.
9,957,399 B2 5/2018 Okazaki et al.
(Continued)

FOREIGN PATENT DOCUMENTS

JP 2015-168805 A 9/2015
JP 2019-202419 A 11/2019
WO 2018/017305 A1 1/2018

OTHER PUBLICATIONS

European Search Report issued in corresponding European Application No. 23218398.8 dated May 16, 2024.

*Primary Examiner* — King Y Poon
(74) *Attorney, Agent, or Firm* — Venable LLP

(57) ABSTRACT

Provided is an aqueous ink for ink jet capable of recording an image excellent in abrasion resistance and color developability. The aqueous ink for ink jet contains: a pigment; a wax; a phosphate ester-based surfactant; and an amine compound. The pigment is a pigment dispersed through an action of at least one kind selected from the group consisting of: a carboxylic acid group; and a sulfonic acid group. The phosphate ester-based surfactant contains an aliphatic alcohol alkoxylate moiety. A ratio of a volume-based 50% cumulative particle diameter of the wax to a volume-based 50% cumulative particle diameter of the pigment is 0.10 times or more to 2.0 times or less.

11 Claims, 2 Drawing Sheets

(56) References Cited

U.S. PATENT DOCUMENTS

| | | | | |
|---|---|---|---|---|
| 10,131,806 | B2 | 11/2018 | Hayashi et al. | |
| 10,233,343 | B2 | 3/2019 | Takebayashi et al. | |
| 10,240,053 | B2 | 3/2019 | Nushiro et al. | |
| 10,253,200 | B2 | 4/2019 | Kakikawa et al. | |
| 10,829,658 | B2 | 11/2020 | Rahimi et al. | |
| 11,827,034 | B2 | 11/2023 | Kusada et al. | |
| 2013/0083117 | A1 * | 4/2013 | Ohmoto | D06P 5/2011 347/20 |
| 2013/0158177 | A1 * | 6/2013 | Ohzeki | C09D 11/40 524/561 |
| 2015/0252200 | A1 | 9/2015 | Kagata et al. | |
| 2022/0242155 | A1 | 8/2022 | Tajima et al. | |
| 2022/0348781 | A1 | 11/2022 | Tasaki et al. | |
| 2023/0183505 | A1 | 6/2023 | Yuasa et al. | |
| 2023/0183509 | A1 | 6/2023 | Kusada et al. | |
| 2023/0405990 | A1 | 12/2023 | Yamashita et al. | |
| 2023/0405993 | A1 | 12/2023 | Ishii et al. | |

* cited by examiner

AQUEOUS INK, INK CARTRIDGE AND INK JET RECORDING METHOD

BACKGROUND OF THE INVENTION

Field of the Invention

The present invention relates to an aqueous ink, an ink cartridge and an ink jet recording method.

Description of the Related Art

An ink jet recording method has been widely used not only in printing of documents in homes and offices but also in commercial printing and industrial printing. In particular, in recent years, a large-sized ink jet printer suitable for printing posters and advertisements has been in widespread use. For such applications, an ink (pigment ink) containing a pigment as a coloring material has been widely used for the purpose of recording an image that is improved in fastness property, such as gas resistance, light fastness and water resistance.

However, it is known that an image recorded with a pigment ink is generally inferior in color developability as compared to an image recorded with an ink (dye ink) containing a dye as a coloring material. In addition, unlike the dye ink with the dye serving as the color material that penetrates a recording medium, in the case of the pigment ink, the pigment serving as the coloring material is deposited on the surface of the recording medium, with the result that an image is liable to be scraped or peeled off by an external force. Thus, when images for posters and advertisements are recorded, it is required that not only the enhancement in image quality but also the improvement in abrasion resistance be achieved.

In order to meet those requirements, in recent years, various kinds of inks have been proposed. For example, there have been proposed inks containing waxes such as a polyolefin made of a chain hydrocarbon in order to record an image that is improved in abrasion resistance (Japanese Patent Application Laid-Open No. 2019-202419, Japanese Patent Application Laid-Open No. 2015-168805, U.S. Pat. No. 10,829,658). The inks proposed in Japanese Patent Application Laid-Open No. 2019-202419, Japanese Patent Application Laid-Open No. 2015-168805 and U.S. Pat. No. 10,829,658 each contain a wax to impart slipperiness to the surface of an image to be recorded to decrease friction resistance, thereby improving the abrasion resistance of an image.

The inventors of the present invention have investigated the characteristics of images recorded with the inks proposed in Japanese Patent Application Laid-Open No. 2019-202419, Japanese Patent Application Laid-Open No. 2015-168805 and U.S. Pat. No. 10,829,658. As a result, with regard to the inks proposed in Japanese Patent Application Laid-Open No. 2019-202419 and Japanese Patent Application Laid-Open No. 2015-168805, it has been found that the abrasion resistance of an image is improved but is not sufficient. With regard to the ink proposed in U.S. Pat. No. 10,829,658, it has been found that, although the abrasion resistance of an image is satisfactory, the color developability of an image is low, and thus there is room for improvement. In order to improve the color developability of an image, further investigations were conducted by adding a water-soluble acrylic resin and a water-soluble urethane resin each having a low aggregation property to an ink, but the color developability of an image was not able to be enhanced.

SUMMARY OF THE INVENTION

Accordingly, an object of the present invention is to provide an aqueous ink for ink jet capable of recording an image excellent in abrasion resistance and color developability. Another object of the present invention is to provide an ink cartridge and an ink jet recording method each using the aqueous ink.

That is, according to the present invention, there is provided an aqueous ink for ink jet including: a pigment; a wax; a dispersant for dispersing the wax; a phosphate ester-based surfactant; and an amine compound, wherein the pigment is a pigment dispersed through an action of at least one kind selected from the group consisting of: a carboxylic acid group; and a sulfonic acid group, wherein the phosphate ester-based surfactant contains an aliphatic alcohol alkoxylate moiety, and wherein a ratio of a volume-based 50% cumulative particle diameter of the wax to a volume-based 50% cumulative particle diameter of the pigment is 0.10 times or more to 2.0 times or less.

Further features of the present invention will become apparent from the following description of exemplary embodiments with reference to the attached drawings.

BRIEF DESCRIPTION OF THE DRAWINGS

FIG. 2A and FIG. 2B are views for schematically illustrating an example of an ink jet recording apparatus to be used in an ink jet recording method of the present invention, in which FIG. 2A is a perspective view of the main portion of the ink jet recording apparatus and FIG. 2B is a perspective view of a head cartridge.

DESCRIPTION OF THE EMBODIMENTS

Figure 1:
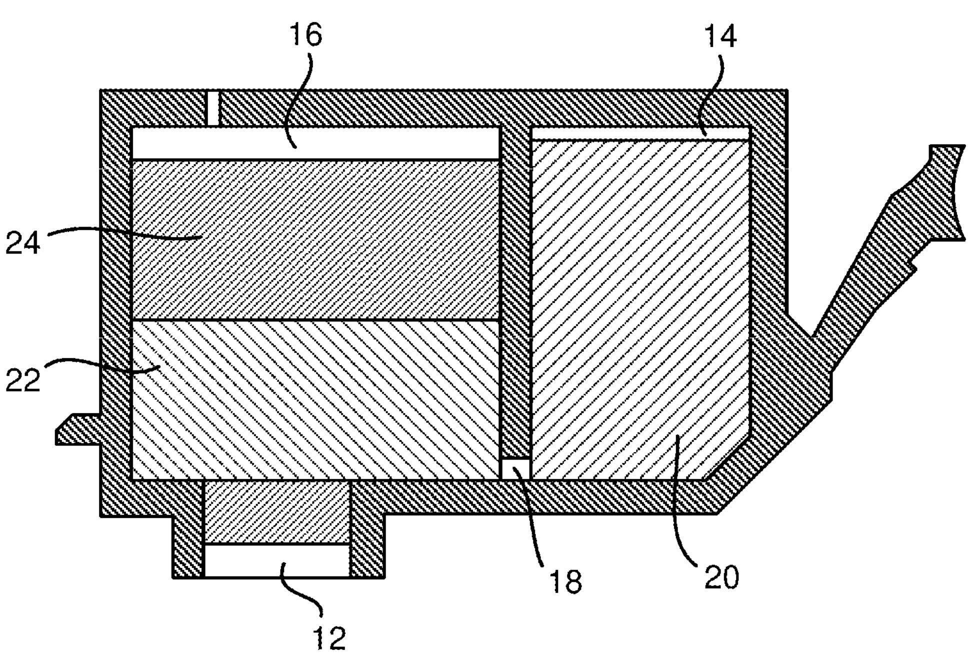
FIG. 1 is a sectional view for schematically illustrating an ink cartridge according to one embodiment of the present invention.

The present invention is described in more detail below by way of exemplary embodiments. In the present invention, when a compound is a salt, the salt is present as dissociated ions in an ink, but the expression "contain a salt" is used for convenience. In addition, an aqueous ink for ink jet is sometimes referred to simply as "ink". Physical property values are values at normal temperature (25° C.), unless otherwise stated. The descriptions "(meth)acrylic acid" and "(meth)acrylate" refer to "acrylic acid or methacrylic acid" and "acrylate or methacrylate", respectively.

In order to investigate the cause of the inability to obtain the color developability of an image even with the inks having the configurations proposed in Japanese Patent Application Laid-Open No. 2019-202419, Japanese Patent Application Laid-Open No. 2015-168805 and U.S. Pat. No. 10,829,658, the inventors have analyzed the inside of a recorded image. As a result, it has been found that voids formed inside an image are increased due to the presence of a wax, and the scattering of incident light is increased, with the result that the color developability of an image is decreased. In addition, it has been found that when a wax having a small particle diameter is used in order to suppress the voids inside the image, the voids are reduced to improve the color developability of an image, but the abrasion resistance of an image is decreased. The inventors have conceived the reason for the foregoing as follows: the wax having a small particle diameter is liable to sink into the lower layer of the image, and the surface of the image cannot be sufficiently protected. Based on the results of the investigations as mentioned above, it has been found that it is difficult to achieve both the abrasion resistance and color developability of an image recorded with an ink containing a pigment as a coloring material at a high level.

In view of the foregoing, in the investigations on the configuration of an ink containing a pigment as a coloring material, the ink being capable of recording an image excellent in abrasion resistance and color developability, the inventors have first focused on suppressing the occurrence of voids through use of a wax having a small particle diameter and allowing the wax to remain on the surface of the image. Specifically, the inventors have investigated a surfactant and an additive that control the aggregating force of the wax in order to aggregate the wax on the surface of the image. As a result, the following details have been found. That is, a ratio of a volume-based 50% cumulative particle diameter of the wax to a volume-based 50% cumulative particle diameter of the pigment is set to 0.10 times or more to 2.0 times or less. Further, a phosphate ester-based surfactant containing an aliphatic alcohol alkoxylate moiety (phosphate ester-based surfactant) and an amine compound are incorporated into the ink. It has been found that, in the above-mentioned case, the abrasion resistance and the color developability of an image become satisfactory.

The aliphatic structure of the aliphatic alcohol alkoxylate moiety of the phosphate ester-based surfactant is similar to the skeleton of the wax, and hence the phosphate ester-based surfactant selectively adsorbs to the wax surface. Thus, when an ink containing a wax and a phosphate ester-based surfactant is used, the wax is likely to remain on the surface of an image, and the abrasion resistance of the image is improved. The phosphate ester-based surfactant adsorbing to the wax is protonated more rapidly as compared to a pigment dispersed through an action of a carboxylic acid group or a sulfonic acid group. The pKa of a phosphoric acid group is higher than the pKa of the carboxylic acid group or the sulfonic acid group, and hence the phosphoric acid group more easily accepts a proton. Thus, when the intermolecular distance between the acid group and the proton becomes short along with the evaporation and penetration of a liquid component during image recording, the phosphoric acid group is more easily protonated as compared to the carboxylic acid group or the sulfonic acid group. When the phosphate ester-based surfactant is protonated, an electrostatic repulsion force is lost, and the affinity with the liquid component of the ink is reduced, resulting in loss of wax fluidity. As a result, the wax that cannot ride on the flow of the ink penetrating the recording medium is likely to remain on the surface of the image.

However, it has been found that despite the use of the wax having a small particle diameter, the color developability of an image is not obtained. When the phosphoric acid group of the phosphate ester-based surfactant is protonated, the aggregating force of the wax becomes strong. The protonation of the pigment slowly proceeds, and hence the aggregating force of the wax is in a state of being stronger than the aggregating force of the pigment. Thus, the aggregation of the wax proceeds relatively quickly as compared to the pigment, and an aggregate of the aggregated wax is formed. It is conceived that the aggregate of the wax to be formed has a large particle diameter, and hence the voids inside the image are increased to decrease the color developability of an image.

Next, the inventors have investigated the addition of a buffer solution to an ink containing a wax and a phosphate ester-based surfactant in order to suppress the aggregating force of the wax, to thereby improve the color developability of an image. The buffer solution is a liquid having a pH that is hardly changed (having a buffering action) even with respect to a change in the surrounding environment. A boric acid-potassium chloride-sodium hydroxide buffer solution and a sodium bicarbonate-sodium hydroxide buffer solution, which were general-purpose buffer solutions, were each used as the buffer solution. As a result, it has been found that the color developability of an image is improved even when any of the buffer solutions is added, but the abrasion resistance of an image is decreased. The addition of the buffer solution causes a buffering action, and hence it becomes easier for the phosphate ester-based surfactant to be ionized to maintain a state of being negatively charged on the molecule as a whole. In addition, even when ink droplets are applied to the recording medium and the evaporation and penetration of a liquid component proceed, the pH of the ink is hardly changed by virtue of the buffering action, and hence the protonation of the dispersant for dispersing the wax and the phosphate ester-based surfactant hardly proceeds. As a result, the following is conceived. The electrostatic repulsion force acts more strongly to weaken the aggregating force of the wax, and an aggregate is less liable to be formed. Thus, the voids inside the image are reduced, and the color developability of an image is improved. Meanwhile, the following is conceived. The image is recorded under a state in which the protonation of the dispersant for dispersing the wax and the phosphate ester-based surfactant is less liable to proceed, with the result that the wax is less likely to remain on the surface of the image and easily penetrates the inside of the image. Thus, the abrasion resistance of an image is decreased.

As a result of further investigations, the inventors have found that when an amine compound is added to an ink containing a wax and a phosphate ester-based surfactant, both the abrasion resistance and the color developability of an image are improved. In an ink containing an amine compound, the phosphate ester-based surfactant is dissociated and negatively charged more easily as compared to an ink containing no amine compound. As a result, the electrostatic repulsion force acts more strongly immediately after the ink droplets are applied to the recording medium to weaken the aggregating force of the wax, and an aggregate of the wax is less liable to be formed. Further, it is conceived that when the alcohol alkoxylate moiety of the phosphate ester-based surfactant is hydrated, an aggregate of the wax is less liable to be formed. After that, when the amine compound and the phosphate ester-based surfactant approach each other along with the evaporation and penetration of a liquid medium, the amine compound and the phosphate ester-based surfactant form a hardly soluble salt.

From the viewpoint of the pKa, the amine compound more easily forms a salt with a phosphoric acid group as compared to a carboxylic acid group or a sulfonic acid group. Thus, the amine compound more easily forms a salt with the phosphate ester-based surfactant as compared to the pigment. The hardly soluble salt formed by the amine compound and the phosphate ester-based surfactant cannot exhibit an electrostatic repulsion force because the negative charge is neutralized, and the affinity thereof with the liquid medium is reduced. Thus, it is conceived that the aggregating force of the wax is abruptly increased along with the formation of the hardly soluble salt. As a result, the wax is less liable to sink into the inside of an image and is more likely to remain on the surface of the image. In addition, it is conceived that a phosphate has solubility lower than that of a carboxylate or a sulfonate, and hence the amine compound more easily reduces the affinity between the wax and the liquid component as compared to the pigment. Further, the protonation of the pigment also proceeds along with the evaporation and penetration of the liquid component, and the aggregating force of the pigment is also becoming strong. Thus, the difference in aggregating force between the wax and the pigment becomes small. As a result, both the aggregation of the pigment and the aggregation of the wax proceed, and the pigment enters a region between the waxes, with the result that an aggregate of only the wax is less liable to be formed. Thus, it is conceived that voids are less liable to be formed in the image to improve the color developability of an image, and the wax remains on the surface of the image to improve the abrasion resistance of an image.

It is required that a ratio of a volume-based 50% cumulative particle diameter of the wax to a volume-based 50% cumulative particle diameter of the pigment be 0.10 times or more to 2.0 times or less. When the ratio is less than 0.10 times, the wax is liable to sink into the inside of the image, and the wax is crushed to be less likely to spread. Thus, an external force is not easily allowed to escape, and the abrasion resistance of an image is not obtained. Meanwhile, when the ratio is more than 2.0 times, voids are liable to be formed inside the image, and light is liable to scatter due to the presence of the wax, with the result that the color developability of an image is not obtained.

(Ink)

An ink of the present invention is an aqueous ink for ink jet including: a pigment; a wax; a dispersant for dispersing the wax; a phosphate ester-based surfactant; and an amine compound. Respective components to be used in the ink and the like are described in detail below.

(Pigment)

The ink includes the pigment as the coloring material. The content (% by mass) of the pigment in the ink is preferably 0.50% by mass or more to 15.00% by mass or less, more preferably 0.50% by mass or more to 10.00% by mass or less with respect to the total mass of the ink.

Specific examples of the pigment may include: inorganic pigments, such as carbon black and titanium oxide; and organic pigments, such as azo, phthalocyanine, quinacridone, isoindolinone, imidazolone, diketopyrrolopyrrole and dioxazine pigments.

When pigments are classified by the dispersion method, a resin-dispersed pigment using a resin as a dispersant, a self-dispersible pigment, which has a hydrophilic group bonded to its particle surface, or the like may be mentioned. In addition, a resin-bonded pigment having a resin-containing organic group chemically bonded to its particle surface, a microcapsule pigment, which contains a particle whose surface is covered with, for example, a resin, or the like may be mentioned. It is not necessary to use the resin particle dyed with a colorant as the coloring material.

The pigment used in the ink of present invention is a pigment dispersed by an action of at least one selected from a group consisting of a carboxylic acid group and a sulfonic acid group.

A resin (resin dispersant) for dispersing the pigment in an aqueous medium has at least one of a carboxylic acid group or a sulfonic acid group. In particular, the pigment is preferably a resin-dispersed pigment dispersed with a resin (resin dispersant) having a carboxylic acid group. The resin dispersant having a sulfonic acid group may be hardly adsorb to the pigment due to relatively high hydrophilicity, and the aggregating force of the pigment is liable to become strong, with the result that the color developability of an image may not be sufficiently obtained. In addition, when the resin dispersant having a sulfonic acid group hardly adsorbs to the pigment, adsorption moieties on the surface of a particle of the pigment are increased, and the phosphate ester-based surfactant becomes liable to adsorb to the pigment. Thus, the difference between the aggregating force of the pigment and the aggregating force of the wax is not easily made, and the abrasion resistance of an image may not be sufficiently obtained. In addition, when the pigment is a self-dispersible pigment dispersed with a carboxylic acid group, the abrasion resistance and the color developability of an image may not be sufficiently obtained. A mass ratio of a content (% by mass) of the pigment in the ink to a content (% by mass) of the resin dispersant therein is preferably 0.30 times or more to 10.0 times or less.

The resin dispersant is preferably a resin having a hydrophilic unit and a hydrophobic unit as constituent units. In addition, the resin dispersant is preferably an acrylic resin containing at least acrylic components, such as a unit derived from (meth)acrylic acid and a unit derived from a (meth)acrylic ester, more preferably a water-soluble acrylic resin. The resin dispersant is particularly preferably a water-soluble acrylic resin in a form of a random copolymer.

The hydrophilic unit is a unit having a hydrophilic group, such as an acid group or a hydroxy group. The hydrophilic unit may be formed, for example, by polymerizing a monomer having a hydrophilic group. Specific examples of the monomer having a hydrophilic group may include: anionic monomers, such as an acidic monomer having a carboxy group, such as (meth)acrylic acid, itaconic acid, maleic acid or fumaric acid, an acidic monomer having a sulfonic acid group, such as styrenesulfonic acid, 2-acrylamido-2-methylpropanesulfonic acid or 3-sulfopropyl (meth)acrylate, and anhydrides or salts of the acidic monomers; a monomer having a hydroxy group, such as 2-hydroxyethyl (meth) acrylate or 3-hydroxypropyl (meth)acrylate; and a monomer having an ethylene oxide group such as methoxy(mono, di, tri, poly)ethylene glycol (meth)acrylate. Examples of a cation for forming the salt of the anionic monomer may include ions of lithium, sodium, potassium, ammonium and an organic ammonium. The acid value of the resin is preferably 50 mgKOH/g or more to 200 mgKOH/g or less.

The self-dispersible pigment is at least one of a carboxylic acid group and a sulfonic acid group bonded to its particle surface directly or through any other atomic group (—R—). The carboxylic acid group and the sulfonic acid group may be any one of an acid type or a salt type. When the group is a salt type, the group may be in any one of a state in which part of the group dissociates or a state in which the entirety thereof dissociates. When the carboxylic acid group and the sulfonic acid group are a salt type, examples of a cation serving as a counterion may include an alkali metal cation, ammonium and an organic ammonium. Specific examples of the other atomic group (—R—) may include: a linear or branched alkylene group having 1 to 12 carbon atoms; an arylene group, such as a phenylene group or a naphthylene group; a carbonyl group; an imino group; an amide group; a sulfonyl group; an ester group; and an ether group. In addition, groups obtained by combining those groups may be adopted.

The volume-based 50% cumulative particle diameter of the pigment is preferably 40 nm or more to 400 nm or less, more preferably 45 nm or more to 350 nm or less. The "volume-based 50% cumulative particle diameter (D50)" of the pigment refers to the diameter of the particle in a particle diameter cumulative curve at which the ratio of the particle integrated from small particle diameters reaches 50% with respect to a total volume of the measured particle. The "volume-based 50% cumulative particle diameter (D50)" may be measured with a particle size distribution-measuring device using a dynamic light scattering method. The measurement method is described in detail later.

Wax

The ink incorporates a wax and a dispersant for dispersing the wax. The wax may be a composition blended with a component except the wax or may be the wax itself. The wax may be dispersed as a wax particle by the dispersant, such as a surfactant or a resin. The term "wax particle" as used herein means particle formed of wax. The waxes may be used alone or in combination thereof. As the wax, natural waxes and synthetic waxes can be mentioned.

The wax is an ester of a higher monohydric or dihydric alcohol that is insoluble in water and a fatty acid in a narrow sense. Accordingly, animal-based waxes and plant-based waxes are included in the category of the wax but oils and fats are not included therein. High-melting point fats, mineral-based waxes, petroleum-based waxes and blends and modified products of various waxes are included therein in a broad sense. In the recording method of the present invention, the waxes in a broad sense may each be used without any particular limitation. The waxes in a broad sense may be classified into natural waxes, synthetic waxes, blends thereof (blended waxes) and modified products thereof (modified waxes).

Examples of the natural wax may include such as animal-based waxes, plant-based waxes, mineral-based waxes and petroleum-based waxes. Examples of the animal-based waxes may include such as lanolin, beeswax, a spermaceti wax and chinese wax. Examples of the plant-based waxes may include such as a carnauba wax, candelilla wax, a rice wax, Japan wax, an ouricury wax, a sugar cane wax and a palm wax. Examples of the mineral-based waxes may include such as a montan wax, an ozokerite, celesin and lignite wax. Examples of the petroleum-based waxes may include such as a paraffin wax, a microcrystalline wax and petrolatum.

Examples of the synthetic wax may include such as synthetic hydrocarbon-based waxes, modified waxes and hydrogenated waxes. Examples of the synthetic hydrocarbon-based wax may include such as a polyolefin wax and a Fischer-Tropsch wax. The modified waxes are obtained by subjecting the above-mentioned various waxes to modification treatment, such as oxidation, hydrogenation, alcohol modification, acrylic modification or urethane modification. Examples of the modified wax may include such as paraffin wax derivatives, montan wax derivatives, microcrystallin wax derivatives. Examples of the hydrogenated wax may include such as custer wax and opal wax.

The wax is preferably derived from at least one selected from a group consisting of a polyethylene wax, a Fischer-Tropsch wax, a microcrystalline wax, a paraffin wax, an ozokerite and celesin. In addition, those waxes may be modified products and blends thereof. Those waxes each do not contain an ester moiety or a carboxyl moiety in a skeleton thereof, and hence are likely to become waxes having high crystallinity. Through use of the wax having high crystallinity, when an external force is applied, the crystal interface slides and spreads out. Thus, the force is easily allowed to escape, and an image more excellent in abrasion resistance can be recorded.

It is required that a ratio of a volume-based 50% cumulative particle diameter of the wax to a volume-based 50% cumulative particle diameter of the pigment be 0.10 times or more to 2.0 times or less. The ratio is particularly preferably 0.20 times or more to 1.5 times or less. As used herein, the term simply referred as "average particle diameter" means "volume-based 50% cumulative particle diameter (D50)". The "volume-based 50% cumulative particle diameter" of the wax refers to the diameter of the particle in a particle diameter cumulative curve at which the ratio of the particle integrated from small particle diameters reaches 50% with respect to a total volume of the measured particle. The "volume-based 50% cumulative particle diameter (D50)" may be measured with a particle size distribution-measuring device using a dynamic light scattering method. As the particle size distribution-measuring device using the dynamic light scattering method, a particle size analyzer (e.g., product name "UPA-EX 150", manufactured by Nikkiso Co., Ltd.) or the like may be used. The measurement conditions in this case may be set, for example, as follows: SetZero: 30 seconds; number of measurements: 3; measurement time: 180 seconds; shape: spherical shape; and refractive index: 1.59. Needless to say, the particle size distribution-measuring device, the measurement conditions and the like to be used are not limited to the foregoing. The volume-based 50% cumulative particle diameter of the wax is preferably 20 nm or more to 200 nm or less, more preferably 30 nm or more to 150 nm or less.

A mass ratio of a total content (% by mass) of the wax and the dispersant for dispersing the wax in the ink to a content (% by mass) of the pigment therein is preferably 0.005 times or more to 0.20 times or less, more preferably 0.01 times or more to 0.05 times or less. When the above-mentioned mass ratio is less than 0.005 times, the total content of the wax and the dispersant for dispersing the wax with respect to the pigment is relatively small, and the wax is less likely to protect the pigment, with the result that the abrasion resistance of an image may not be sufficiently obtained. Meanwhile, when the above-mentioned mass ratio is more than 0.20 times, the incident light may be liable to be scattered by the wax, and the color developability of an image may not be sufficiently obtained. The total content (% by mass) of the wax and the dispersant for dispersing the wax in the ink is preferably 0.010% by mass or more to 1.50% by mass or less, more preferably 0.030% by mass or more to 1.00% by mass or less with respect to the total mass of the ink.

Phosphate Ester-based Surfactant

The ink contains a phosphate ester-based surfactant containing an aliphatic alcohol alkoxylate moiety. The aliphatic alcohol alkoxylate moiety means a moiety in which a polyalkylene oxide and an aliphatic hydrocarbon are bonded to each other. Examples of the polyalkylene oxide may include polyethylene oxide, polypropylene oxide and polybutylene oxide. Of those, polyethylene oxide or polypropylene oxide is preferred, and polyethylene oxide is more preferred. The phosphoric acid group of the phosphate ester-based surfactant may be in any of an acid form and a salt form. When the phosphoric acid group is in a salt form, the group may be in any of a partially dissociated state or an entirely dissociated state. When the phosphoric acid group is in a salt form, as a cation serving as a counter ion, there may be given an alkali metal cation, ammonium, an organic ammonium and the like. The phosphate ester moiety may be any of a monoester and a diester, and may be a mixture thereof. The content (% by mass) of the above-mentioned phosphate ester-based surfactant in the ink is preferably 0.10% by mass or more to 5.00% by mass or less, more preferably 0.10% by mass or more to 2.00% by mass or less. The total content (% by mass) of the surfactant in the ink is preferably 0.10% by mass or more to 5.00% by mass or less, more preferably 0.10% by mass or more to 2.50% by mass or less.

The phosphate ester-based surfactant is preferably a compound represented by the following general formula (1). The chain hydrocarbon group represented by $R_1$ may be linear or branched. In particular, the chain hydrocarbon group is preferably linear in consideration of the adsorption with the wax. In addition, the chain hydrocarbon group is preferably free of a substituent. Further, the chain hydrocarbon group may be a saturated chain hydrocarbon group or an unsaturated chain hydrocarbon group with a double bond or a triple bond. When the number of carbon atoms of the chain hydrocarbon group represented by $R_1$ is less than 12 or "a" represents more than 10 in the following general formula (1), the hydrophilicity may be excessively increased, and hence the wax is less likely to remain on the surface of an image, with the result that the abrasion resistance of an image may not be sufficiently obtained. Meanwhile, when the number of carbon atoms of the chain hydrocarbon group represented by $R_1$ is more than 24 in the following general formula (1), the hydrophobicity may be excessively increased. Thus, voids are liable to be formed in an image due to the approach between the waxes, and the color developability of an image may not be sufficiently obtained.

(1)

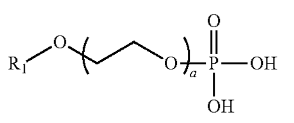

In the general formula (1), $R_1$ represents a chain hydrocarbon group having 12 or more to 24 or less carbon atoms, and "a" represents an integer of 1 or more to 10 or less.

The phosphate ester-based surfactant is more preferably a compound represented by the following general formula (2). When the phosphate ester-based surfactant represented by the following general formula (2) is used, the abrasion resistance of an image can be further improved from the viewpoint of hydrophilicity, and the color developability of an image can be further improved from the viewpoint of hydrophobicity. In addition, the structure represented by the following general formula (2) has a bent structure because of the presence of a double bond, and is more flexible than a saturated hydrocarbon having a linear structure that is not bent. Thus, the phosphate ester-based surfactant represented by the following general formula (2) more easily adsorbs to the wax, and can suppress an excessive increase in aggregating force of the wax. Accordingly, through use of the phosphate ester-based surfactant represented by the following general formula (2), the occurrence of voids inside an image can be further suppressed, and the wax is more likely to remain on the surface of the image, with the result that the abrasion resistance and the color developability of an image can be further enhanced. In the general formula (2), "a" particularly preferably represents 3 or more to 5 or less.

(2)

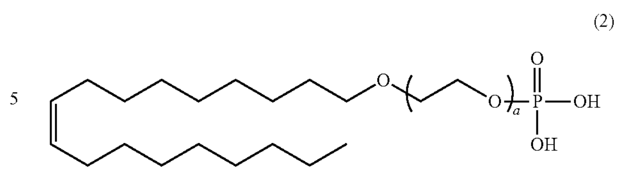

In the general formula (2), "a" represents an integer of 1 or more to 10 or less.

Amine Compound

The ink contains an amine compound. Examples of the amine compound may include tris(hydroxymethyl)aminomethane, monoethanolamine, diethanolamine, triethanolamine, monoisopropanolamine, diisopropanolamine, triisopropanolamine, N-methylethanol, N-dimethylethanol, dicyclohexylamine, dimethylcyclohexylamine, triethylamine, 3-[N,N-bis(hydroxyethyl)amino]-2-hydroxypropanesulfonic acid, 2-hydroxy-3-[4-(2-hydroxyethyl)-1-piperazinyl]propanesulfonic acid, N,N-bis(2-hydroxyethyl)glycine and N-tris(hydroxymethyl)methyl-3-aminopropanesulfonic acid. In particular, the amine compound is preferably an alkanolamine. Examples of the alkanolamine may include tris(hydroxymethyl)aminomethane, monoethanolamine, diethanolamine, triethanolamine, monoisopropanolamine, diisopropanolamine, triisopropanolamine, N-methylethanol, and N-dimethylethanol. An amine compound that does not contain a hydroxy group in a molecule thereof has somewhat low hydrophilicity. Thus, when the amine compound that does not contain a hydroxy group in a molecule thereof is used, the aggregating force of the wax may become strong, and voids are liable to occur inside an image, with the result that the color developability of an image may not be sufficiently obtained.

The amine compound is more preferably triethanolamine. Primary and secondary alkanolamines each have high basicity and easily abstract a proton from the surface of the recording medium. When the proton is abstracted from the surface of the recording medium by the alkanolamine, the aggregation rate of the pigment that is aggregated through a reaction with the proton is decreased, and the aggregating force of the wax is liable to become stronger than the aggregating force of the pigment. Thus, an aggregate of the wax is formed, and voids are liable to occur inside an image, with the result that the color developability of an image may not be sufficiently obtained. When the alkanol group is a trialkanol group having a chain longer than that of the triethanol group, the hydrophobicity is increased due to the long carbon chain, and the aggregating force of the wax may become strong. As a result, the wax is liable to be aggregated to cause voids to occur inside the image, and the color developability of an image may not be sufficiently obtained. In contrast, when triethanolamine is used as the amine compound, voids are less liable to occur inside the image as compared to the case of using other amine compounds. In addition, the wax is more likely to remain on the surface of the image, and the abrasion resistance and the color developability of an image can be further enhanced.

A molar ratio of a content (% by mol) of the amine compound in the ink to a content (% by mol) of the phosphate ester-based surfactant therein is preferably 1.0 times or more to 5.0 times or less, more preferably 1.5 times or more to 3.0 times or less. When the molar ratio is less than 1.0 times, the phosphate ester-based surfactant is less likely to be negatively charged, and the aggregating force of the phosphate ester-based surfactant is liable to become strong. As a result, voids may be liable to occur inside an image, and the color developability of an image may not be sufficiently obtained. Meanwhile, when the molar ratio is more than 5.0 times, the amine compound is liable to be in a state of being always present in the vicinity of the phosphate ester-based surfactant. For this reason, the formation rate of a hardly soluble salt formed by the amine compound and the phosphate ester-based surfactant is liable to become high, and the aggregating force of the wax is liable to become strong immediately after recording. Thus, the aggregating force of the wax is liable to be in a state of being excessively strong as compared to the aggregating force of the pigment, and the pigment is less likely to enter a region between the waxes. As a result, an aggregate of the wax is liable to be formed, and voids may be liable to occur inside an image, with the result that the color developability of an image may not be sufficiently obtained. The content (% by mass) of the amine compound in the ink is preferably 0.10% by mass or more to 1.50% by mass or less, more preferably 0.20% by mass or more to 1.00% by mass or less with respect to the total mass of the ink.

Aqueous Medium

The ink of the invention is an aqueous ink including at least water as an aqueous medium. Deionized water (ion-exchanged water) is preferably used as the water. The content (% by mass) of the water in the ink is preferably 50.00% by mass or more to 95.00% by mass or less with respect to the total mass of the ink. Solvents that may be used in an ink for ink jet, such as alcohols, glycols, (poly) alkylene glycols, nitrogen-containing compounds and sulfur-containing compounds, may each be used as the water-soluble organic solvent. The content (% by mass) of the water-soluble organic solvent in the ink is preferably 3.00% by mass or more to 50.00% by mass or less with respect to the total mass of the ink. When the content of the water-soluble organic solvent is outside the above-mentioned range, the reliability of the aqueous ink for inkjet, such as the sticking resistance, may be slightly degraded.

Other Components

The ink may contain a water-soluble organic compound that is solid at 25° C., for example, a polyhydric alcohol, such as trimethylolpropane or trimethylolethane, urea or a urea derivative such as ethylene urea, as required in addition to the above-mentioned components. Further, the ink may contain any one of various additives, such as a surfactant except the phosphate ester-based surfactant, a pH adjuster, an antifoaming agent, a rust inhibitor, an antiseptic, an antifungal agent, an antioxidant, an anti-reducing agent and a chelating agent, as required.

Physical Properties of Ink

The ink of the invention is an aqueous ink to be applied to an ink jet system. Accordingly, from the viewpoint of reliability, it is preferred that the physical property values of the ink be appropriately controlled. Specifically, the viscosity of the ink at 25° C. is preferably 1.0 mPa's or more to 10.0 mPa's or less, more preferably 1.0 mPa's or more to 5.0 mPa's or less, even more preferably 1.0 mPa's or more to 3.0 mPa's or less. In addition, the surface tension of the ink at 25° C. is preferably 10 mN/m or more to 60 mN/m or less, more preferably 20 mN/m or more to 60 mN/m or less, even more preferably 30 mN/m or more to 50 mN/m or less. The pH of the ink at 25° C. is preferably 5.0 or more to 10.0 or less, more preferably 7.0 or more to 9.5 or less.

Ink Cartridge

An ink cartridge of the present invention includes an ink and an ink storage portion configured to store the ink. In addition, the ink stored in the ink storage portion is the aqueous ink of the present invention described above. FIG. 1 is a sectional view for schematically illustrating an ink cartridge according to one embodiment of the present invention. As illustrated in FIG. 1, an ink supply port 12 for supplying an ink to a recording head is arranged on the bottom surface of the ink cartridge. The inside of the ink cartridge is the ink storage portion for storing the ink. The ink storage portion includes an ink storage chamber 14 and an absorbent storage chamber 16 and the chambers communicate to each other through a communication port 18. In addition, the absorbent storage chamber 16 communicates to the ink supply port 12. While a liquid ink 20 is stored in the ink storage chamber 14, absorbents 22 and 24 each configured to hold the ink in a state of being impregnated therewith are stored in the absorbent storage chamber 16. The ink storage portion may be of a form that is free of an ink storage chamber configured to store the liquid ink and is configured to hold the total amount of the ink to be stored with the absorbents. In addition, the ink storage portion may be of a form that is free of an absorbent and is configured to store the total amount of the ink in a liquid state. Further, an ink cartridge of a form formed to include the ink storage portion and a recording head may be adopted.

Ink Jet Recording Method

An ink jet recording method of the present invention is a method including recording an image on a recording medium by ejecting the aqueous ink of the present invention described above from a recording head of an ink jet system. A system of ejecting the ink is, for example, a system involving applying mechanical energy to the ink or a system involving applying thermal energy to the ink. In the present invention, the system involving applying the thermal energy to the ink to eject the ink is particularly preferably adopted. The step of the ink jet recording method only needs to be a known step except that the ink of the present invention is used.

Figure 2A:
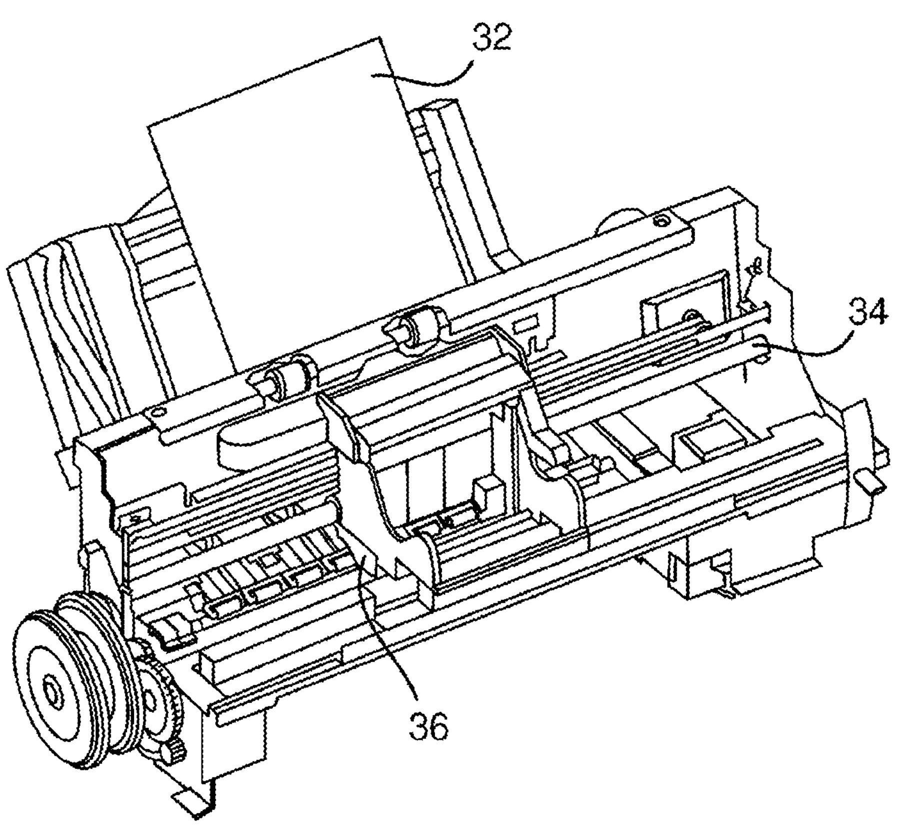
Figure 2B:
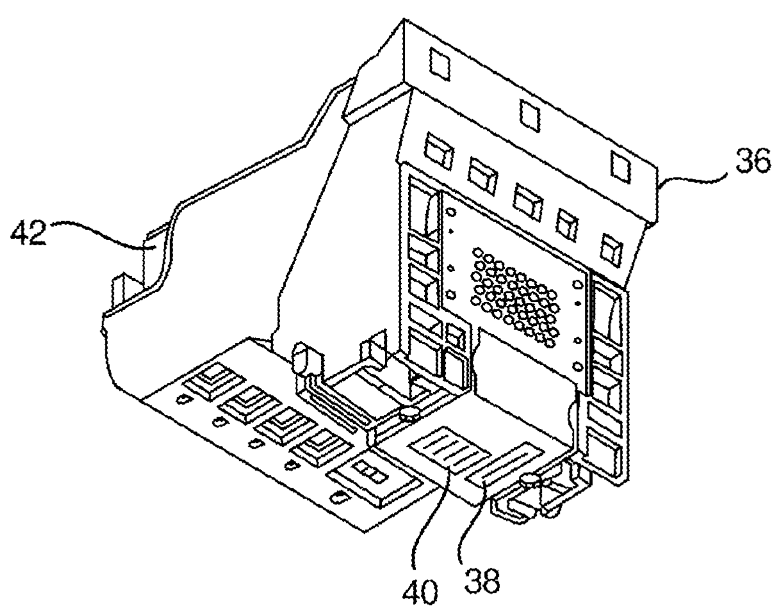

FIG. 2A and FIG. 2B are views for schematically illustrating an example of an ink jet recording apparatus to be used in the ink jet recording method of the present invention, in which FIG. 2A is a perspective view of the main portion of the ink jet recording apparatus and FIG. 2B is a perspective view of a head cartridge. A conveying unit (not shown) configured to convey a recording medium 32 and a carriage shaft 34 are arranged in the ink jet recording apparatus. A head cartridge 36 may be mounted on the carriage shaft 34. The head cartridge 36 includes recording heads 38 and 40 and is formed so that an ink cartridge 42 may be set therein. While the head cartridge 36 is conveyed along the carriage shaft 34 in a main scanning direction, the ink (not shown) is ejected from the recording heads 38 and 40 toward the recording medium 32. Then, the recording medium 32 is conveyed by the conveying unit (not shown) in a sub-scanning direction. Thus, the image is recorded on the recording medium 32.

EXAMPLES

The present invention is described in more detail below by way of Examples and Comparative Examples. The present invention is by no means limited to Examples below without departing from the gist of the present invention. "Part(s)" and "%" with regard to the description of the amounts of components are by mass, unless otherwise stated.

Method of Measuring Physical Property Values

Volume-Based 50% Cumulative Particle Diameters $D_{50}$ of Pigment and Wax

A dispersion liquid of a pigment and a dispersion liquid of wax particles (particles formed of a wax) were each diluted with pure water to prepare a sample. The volume-based 50% cumulative particle diameters of the particles in the prepared samples (50% cumulative particle diameter of the pigment ($DP_{50}$) and 50% cumulative particle diameter of the wax ($DW_{50}$)) were each measured with a particle size analyzer using a dynamic light scattering method. Measurement conditions were set as follows: SetZero: 30 seconds; number of times of measurement: 3; measurement time: 180 seconds; shape: spherical shape; and refractive index: 1.50. As the particle size analyzer using the dynamic light scattering method, the one with a product name "NANOTRAC UPA-EX150" (manufactured by Nikkiso Co., Ltd.) was used.

Acid Value of Resin

A resin was dispersed or dissolved in water to prepare a sample. The prepared sample was subjected to potentiometric titration with a potentiometric automatic titration device with a methyl glycol chitosan 200/N titration solution (manufactured by FUJIFILM Corporation), and the number of anionic functional groups per gram of the resin was calculated. The calculated number of anionic functional groups was converted to a KOH mass and defined as an acid value (mgKOH/g) of the resin. As the potentiometric automatic titration device, the one with a product name "AT510" (manufactured by Kyoto Electronics Manufacturing Co., Ltd.) was used.

Synthesis of Copolymer

Styrene-Acrylic Acid Copolymer

A four-necked flask including a stirring machine, a reflux condenser and a nitrogen gas-introducing tube was prepared. 100.00 Parts of ethylene glycol monobutyl ether was loaded into the prepared flask, a nitrogen gas was introduced thereto, and the temperature was increased to 110° C. under stirring. A mixture of 39.50 parts of styrene, 40.00 parts of methyl methacrylate and 21.00 parts of acrylic acid and an ethylene glycol monobutyl ether solution of 1.30 parts of t-butyl peroxide (polymerization initiator) were added dropwise to the flask over 3 hours. After aging for 2 hours, ethylene glycol monobutyl ether was removed under reduced pressure. Thus, a solid styrene-acrylic acid copolymer was obtained. The resultant styrene-acrylic acid copolymer was neutralized and dissolved by adding potassium hydroxide equivalent to an acid value and an appropriate amount of ion-exchanged water thereto, followed by heating to 80° C. Thus, an aqueous solution of a styrene-acrylic acid copolymer in which a content of a resin (solid content) was 20.00% was obtained. The acid value of the resultant styrene-acrylic acid copolymer was 170 mgKOH/g, and the weight-average molecular weight thereof was 8,000. By appropriately changing the amount of acrylic acid to be used, aqueous solutions of styrene-acrylic acid copolymers having acid values of 50 mgKOH/g and 200 mgKOH/g were obtained, respectively.

Styrene-Styrenesulfonic Acid Copolymer

An aqueous solution of a styrene-styrenesulfonic acid copolymer in which a content of a resin (solid content) was 20.00% was obtained in the same manner as in the case of the styrene-acrylic acid copolymer described above except that styrenesulfonic acid was used instead of acrylic acid. The acid value of the resultant styrene-styrenesulfonic acid copolymer was 170 mgKOH/g, and the weight-average molecular weight thereof was 8,000. In addition, by appropriately changing the amount of styrenesulfonic acid to be used, aqueous solutions of styrene-styrenesulfonic acid copolymers having acid values of 50 mgKOH/g and 200 mgKOH/g were obtained.

Styrene-2-Methacryloyloxyethyl Phosphonic Acid Copolymer

An aqueous solution of a styrene-2-methacryloyloxyethyl phosphonic acid copolymer in which a content of a resin (solid content) was 20.00% was obtained in the same manner as in the case of the styrene-acrylic acid copolymer described above except that 2-methacryloyloxyethyl phosphonic acid was used instead of acrylic acid. As 2-methacryloyloxyethyl phosphonic acid, the one with a product name "Light Ester P-1M" (manufactured by Kyoeisha Chemical Co., Ltd.) was used. The acid value of the resultant styrene-2-methacryloyloxyethyl phosphonic acid copolymer was 170 mgKOH/g, and the weight-average molecular weight thereof was 8,000.

Production of Pigment Dispersion Liquid

Pigment Dispersion Liquid 1

12.00 Parts of a pigment, 24.00 parts of an aqueous solution of a resin dispersant and 64.00 parts of ion-exchanged water were mixed to provide a mixture. As the pigment, carbon black (product name: "Black Pearls 880", manufactured by Cabot Corporation) was used. As the aqueous solution of a resin dispersant, an aqueous solution in which a content of a resin (solid content) was 20.00%, which was obtained by neutralizing a styrene-acrylic acid copolymer having an acid value of 170 mgKOH/g and a weight-average molecular weight of 8,000 with a 10.0% sodium hydroxide aqueous solution, was used. The resultant mixture was placed in a batch-type vertical sand mill (manufactured by Aimex Co., Ltd.), and 85 parts of 0.3 mm zirconia beads were filled into the sand mill. The mixture was subjected to dispersion treatment while being cooled with water. The dispersion time and dispersion pressure were appropriately adjusted so as to achieve an average particle diameter described later. Subsequently, the non-dispersed material including coarse particles was removed by centrifugation treatment. Further, the resultant was filtered with a cellulose acetate filter (manufactured by Advantec Toyo Kaisha, Ltd.) having a pore size of 3.0 μm under pressure to provide a pigment dispersion liquid 1 in which a content of the pigment was 10.00% and a content of the resin was 4.00%. The average particle diameter of the pigment ($DP_{50}$) of the resultant pigment dispersion liquid 1 was 65 nm.

Pigment Dispersion Liquid 2

A pigment dispersion liquid 2 having a C.I. Pigment Blue 15:3 (product name: "Hostaperm Blue B2G", manufactured by Clariant (Japan) K.K.) content of 10.0% and a resin content of 4.0% was prepared by the same procedure as that of the above-mentioned pigment dispersion liquid 1 except that the pigment was changed to C.I. Pigment Blue 15:3. The average particle diameter of the pigment ($DP_{50}$) of the resultant pigment dispersion liquid 2 was 120 nm.

Pigment Dispersion Liquid 3

A pigment dispersion liquid 3 having a solid solution of C.I. Pigment Red 202 and C.I. Pigment Violet 19 (product name: "CROMOPHTAL JET MAGENTA 2BC", manufactured by Ciba Japan K.K.) content of 10.00% and a resin content of 4.00% was prepared by the same procedure as that of the above-mentioned pigment dispersion liquid 1 except that the pigment was changed to the solid solution of C.I. Pigment Red 202 and C.I. Pigment Violet 19. The average particle diameter of the pigment ($DP_{50}$) of the resultant pigment dispersion liquid 3 was 120 nm.

Pigment Dispersion Liquid 4

A pigment dispersion liquid 4 having a C.I. Pigment Yellow 74 (product name: "Hanca yellow 5CXB", manufactured by Clariant (Japan) K.K.) content of 10.0% and a resin content of 4.0% was prepared by the same procedure as that of the above-mentioned pigment dispersion liquid 1 except that the pigment was changed to C.I. Pigment Yellow 74. The average particle diameter of the pigment ($DP_{50}$) of the resultant pigment dispersion liquid 4 was 120 nm.

Pigment Dispersion Liquid 5

As an aqueous solution of a resin dispersant, an aqueous solution in which a content of a resin (solid content) was 20.00%, which was obtained by neutralizing a styrene-acrylic acid copolymer having an acid value of 50 mgKOH/g and a weight-average molecular weight of 8,000 with a 10.0% sodium hydroxide aqueous solution, was used. A pigment dispersion liquid 5 was obtained in the same manner as in the case of the pigment dispersion liquid 1 described above except for the foregoing. The content of the pigment in the pigment dispersion liquid 5 was 10.00%, and the content of the resin was 4.00%. In addition, the average particle diameter of the pigment ($DP_{50}$) in the resultant pigment dispersion liquid 5 was 65 nm.

Pigment Dispersion Liquid 6

As an aqueous solution of a resin dispersant, an aqueous solution in which a content of a resin (solid content) was 20.00%, which was obtained by neutralizing a styrene-acrylic acid copolymer having an acid value of 200 mgKOH/g and a weight-average molecular weight of 8,000 with a 10.0% sodium hydroxide aqueous solution, was used. A pigment dispersion liquid 6 was obtained in the same manner as in the case of the pigment dispersion liquid 1 described above except for the foregoing. The content of the pigment in the pigment dispersion liquid 6 was 10.00%, and the content of the resin was 4.00%. In addition, the average particle diameter of the pigment ($DP_{50}$) in the resultant pigment dispersion liquid 6 was 65 nm.

Pigment Dispersion Liquid 7

An aqueous solution obtained by dissolving 5.0 g of concentrated hydrochloric acid in 5.5 g of water was brought into the state of being cooled to 5° C., followed by the addition of 1.6 g of 4-aminophthalic acid (treating agent) to the solution. Next, a container containing the aqueous solution was loaded into an ice bath, and while the solution was stirred so that its temperature was held at 10° C. or less, a solution obtained by dissolving 0.9 g of sodium nitrite in 9.0 g of ion-exchanged water at 5° C. was added thereto. After the mixture had been stirred for 15 minutes, 6.0 g of carbon black (Specific surface area 260 m2/g) was added to the mixture under stirring and the whole was further stirred for 15 minutes to provide a slurry. The resultant slurry was filtered with filter paper (product name: "STANDARD FILTER PAPER No. 2," manufactured by Advantec), and particle remaining on the filter paper were sufficiently washed with water and dried in an oven at 110° C. After that, a sodium ion was substituted with a potassium ion by an ion exchange method. Thus, a self-dispersible pigment in which a $-C_6H_3-(COOK)_2$ group was bonded to the particle surface of the pigment was obtained. To this an appropriate amount of ion-exchanged water was added to obtain pigment dispersion liquid 7. The pigment content in pigment dispersion liquid 7 was 10.00%. The average particle diameter of the pigment (DP 50) in the resultant pigment dispersion liquid 7 was 85 nm.

Pigment Dispersion Liquid 8

As an aqueous solution of a resin dispersant, an aqueous solution in which a content of a resin (solid content) was 20.00%, which was obtained by neutralizing a styrene-styrenesulfonic acid copolymer having an acid value of 170 mgKOH/g and a weight-average molecular weight of 8,000 with a 10.0% sodium hydroxide aqueous solution, was used. A pigment dispersion liquid 8 was obtained in the same manner as in the case of the pigment dispersion liquid 1 described above except for the foregoing. The content of the pigment in the pigment dispersion liquid 8 was 10.00%, and the content of the resin was 4.00%. In addition, the average particle diameter of the pigment (DP 50) in the resultant pigment dispersion liquid 8 was 65 nm.

Pigment Dispersion Liquid 9

As an aqueous solution of a resin dispersant, an aqueous solution in which a content of a resin (solid content) was 20.00%, which was obtained by neutralizing a styrene-styrenesulfonic acid copolymer having an acid value of 50 mgKOH/g and a weight-average molecular weight of 8,000 with a 10.0% sodium hydroxide aqueous solution, was used. A pigment dispersion liquid 9 was obtained in the same manner as in the case of the pigment dispersion liquid 1 described above except for the foregoing. The content of the pigment in the pigment dispersion liquid 9 was 10.00%, and the content of the resin was 4.00%. In addition, the average particle diameter of the pigment (DP so) in the resultant pigment dispersion liquid 9 was 65 nm.

Pigment Dispersion Liquid 10

As an aqueous solution of a resin dispersant, an aqueous solution in which a content of a resin (solid content) was 20.00%, which was obtained by neutralizing a styrene-styrenesulfonic acid copolymer having an acid value of 200 mgKOH/g and a weight-average molecular weight of 8,000 with a 10.0% sodium hydroxide aqueous solution, was used. A pigment dispersion liquid 10 was obtained in the same manner as in the case of the pigment dispersion liquid 1 described above except for the foregoing. The content of the pigment in the pigment dispersion liquid 10 was 10.00%, and the content of the resin was 4.00%. In addition, the average particle diameter of the pigment ($DP_{50}$) in the resultant pigment dispersion liquid 10 was 65 nm.

Pigment Dispersion Liquid 11 to 14

A pigment dispersion liquid 11 to 14 were obtained in the same manner as in the case of the pigment dispersion liquid 1, except that the dispersion time and the dispersion pressure in a batch vertical Sandoz mill were appropriately changed. The content of the pigment in the pigment dispersion liquid 11 to 14 were 10.00%, and the content of the resin were 4.00%. In addition, the average particle diameter of the pigment ($DP_{50}$) in the resultant pigment dispersion liquid 11 to 14 were 50 nm, 48 nm, 300 nm and 330 nm respectively.

Pigment Dispersion Liquid 15

As an aqueous solution of a resin dispersant, an aqueous solution in which a content of a resin (solid content) was 20.00%, which was obtained by neutralizing a styrene-Styrene-2-Metacroyloxyethyl Phosphonic acid copolymer having an acid value of 170 mgKOH/g and a weight-average molecular weight of 8,000 with a 10.0% sodium hydroxide aqueous solution, was used. A pigment dispersion liquid 15 was obtained in the same manner as in the case of the pigment dispersion liquid 1 described above except for the foregoing. The content of the pigment in the pigment dispersion liquid 15 was 10.00%, and the content of the resin was 4.00%. In addition, the average particle diameter of the pigment ($DP_{50}$) in the resultant pigment dispersion liquid 15 was 65 nm.

Production of Aqueous Dispersion Liquid of Wax Particles

Aqueous Dispersion Liquids of Wax Particles 1, 7 and 8

A four-necked flask including a stirring machine, a temperature gauge, a reflux condenser and a nitrogen gas-introducing tube was prepared. 225 g of ion-exchanged water and 50 g of polyethylene wax were loaded into the four-necked flask, and the temperature was kept at 90° ° C. to 95° ° C. to melt the polyethylene wax, followed by stirring. 25 g of a liquid containing an ethylene-acrylic resin was added to the resultant, and dispersion treatment was performed for 15 minutes with an ultrasonic homogenizer while the temperature was kept at 90° ° C. to 95° C. After that, the resultant was cooled to room temperature to provide a dispersion. Ion-exchanged water was added to the resultant dispersion to adjust the content of the wax and the dispersant thereof (solid content) to 10.00%. Thus, an aqueous dispersion liquid of wax particles 1 was obtained. The average particle diameter of the wax ($DW_{50}$) in the resultant aqueous dispersion liquid was 40 nm. In addition, aqueous dispersion liquids of wax particles 7 and 8 were obtained in the same manner as in the production of the aqueous dispersion liquid of the wax particles 1 except that the dispersion treatment time was appropriately changed so as to achieve average particle diameters shown in Table 1.

Aqueous Dispersion Liquids of Wax Particles 2 to 6 and 9 to 11

Aqueous dispersion liquids of wax particles 2 to 6 and 9 to 11 were each obtained by adjusting the content of a wax and a dispersant thereof (solid content) to 10.00% in the same manner as in the case of the aqueous dispersion liquid of the wax particles 1 described above except that waxes of the kinds shown in Table 1 were used. The average particle diameters of the waxes ($DW_{50}$) in the resultant aqueous dispersion liquids are shown in Table 1. The average particle diameter of the wax ($DW_{50}$) was adjusted by changing the dispersion treatment time with an ultrasonic homogenizer.

TABLE 1

| Types of wax particles | | | | |
|---|---|---|---|---|
| Wax particle | Type of wax | Average particle diameter $DW_{50}$ (nm) | Product name | Manufactured by |
| 1 | Polyethylene | 40 | — | — |
| 2 | Fischer-Tropsch | 120 | Sasolwax C80 | Sasol |
| 3 | Microcrystallin | 100 | Hi-Mic-1070 | Nippon Seiro Co. Ltd |
| 4 | Paraffin | 100 | Paraffin Wax-115 | Nippon Seiro Co. Ltd |
| 5 | Ozokerite | 100 | Ozokerite Wax Pastilles SP-1021P | Strahl and Pitsch |
| 6 | Celesin | 100 | Refined Ceresin N | Nikko Rica Corporation. |
| 7 | Polyethylene | 100 | — | — |
| 8 | Polyethylene | 30 | — | — |
| 9 | Montan | 100 | Licowax KST | Clariant Chemical |
| 10 | Carnauba | 100 | Carnauba wax No. 1 powder | Toyochem Co., Ltd. |
| 11 | Shellac | 100 | Shellac | Koyo Chemical Co., Ltd. |

Production of Aqueous Dispersion Liquid of Acrylic Resin Particles 18.00 Parts of butyl methacrylate, 0.35 part of methacrylic acid, 2.00 parts of a polymerization initiator and 2.00 parts of n-hexadecane were loaded into a flask including a stirring device, a nitrogen gas-introducing tube, a reflux condenser and a temperature gauge, and the mixture was stirred for 30 minutes while a nitrogen gas was introduced into the flask. As the polymerization initiator, 2,2'-azobis(2-methylbutylnitrile) was used. Then, 78.00 parts of a 6.0% aqueous solution of polyoxyethylene cetyl ether (product name: "NIKKOL BC-20", manufactured by Nikko Chemicals Co., Ltd.) was added dropwise to the flask, followed by stirring for 30 minutes, to provide a mixture. The mixture was emulsified by irradiation with an ultrasonic wave for 3 hours with an ultrasonic irradiator, and then a polymerization reaction was performed at 80° C. for 4 hours under a nitrogen atmosphere. After the resultant was cooled to 25° C. to be filtered, an appropriate amount of pure water was added to the resultant. Thus, an aqueous dispersion liquid of acrylic resin particles in which a content of the resin particles was 20.00% by mass was obtained.

Production of Aliphatic Alcohol Alkoxylate

Each of aliphatic alcohols of the kinds and amounts shown in Table 2 and 1.8 mmol of a potassium hydroxide catalyst were loaded into a flask including a stirring device, a nitrogen gas-introducing tube, a reflux condenser and a temperature gauge. Ethylene oxide (manufactured by Tokyo Chemical Industry Co., Ltd.) of the amount shown in Table 2 was added to the mixture under stirring at 110° C. to 120° ° C. The reaction products were neutralized and then filtered to provide aliphatic alcohol alkoxylates 1 to 13. The numbers of carbon atoms of aliphatic moieties of the resultant aliphatic alcohol alkoxylates 1 to 13 and the numbers of moles added (numbers of repeating units) of ethylene oxide (EO) are shown on the right side of Table 2.

TABLE 2

Types of aliphatic alcohol alkoxylates

| Aliphatic alcohol alkoxylate | Aliphatic alcohol | Amount of aliphatic alcohol (mol) | Amount of ethylene oxide (mol) | Carbon number of the aliphatic site | Number of added moles of EO |
|---|---|---|---|---|---|
| 1 | Oleyl alcohol | 0.25 | 0.75 | 18 | 3 |
| 2 | Oleyl alcohol | 0.25 | 1.25 | 18 | 5 |
| 3 | Lauryl alcohol | 0.25 | 1.25 | 12 | 5 |
| 4 | Decanol | 0.25 | 1.25 | 10 | 5 |
| 5 | Tetracosanol | 0.25 | 1.25 | 24 | 5 |
| 6 | Hexacosanol | 0.25 | 1.25 | 26 | 5 |
| 7 | Stearyl alcohol | 0.25 | 0.25 | 18 | 1 |
| 8 | Stearyl alcohol | 0.25 | 2.50 | 18 | 10 |
| 9 | Stearyl alcohol | 0.25 | 2.75 | 18 | 11 |
| 10 | Cetanol | 0.25 | 1.25 | 16 | 5 |
| 11 | Eicosanol | 0.25 | 1.25 | 20 | 5 |
| 12 | Stearyl alcohol | 0.25 | 1.25 | 18 | 5 |
| 13 | Linoleyl alcohol | 0.25 | 1.25 | 18 | 5 |

<Production of Phosphate Ester-based Surfactant>

Strong phosphoric acid (manufactured by Rasa Industries, Ltd.) and N,N-dimethylformamide were loaded into a flask including a stirring device, a nitrogen gas-introducing tube, a reflux condenser and a temperature gauge, followed by stirring at 60° C. Each of aliphatic alcohol alkoxylates or aliphatic alcohols of the kinds shown in Table 3 was added dropwise to the flask, and then the temperature was increased to 80° C. and the mixture was subjected to a reaction for 12 hours. Then, saturated saline was added to the resultant, followed by stirring at 60° C. for 12 hours, to hydrolyze a pyrophosphate ester. Thus, phosphate ester-based surfactants 1 to 14 were obtained. The numbers of carbon atoms of aliphatic moieties of the resultant phosphate ester-based surfactants 1 to 14 and the numbers of moles added (numbers of repeating units) of ethylene oxide are shown on the right side of Table 3. The phosphate ester-based surfactant 8 is a phosphate ester-based surfactant free of an aliphatic alcohol alkoxylate moiety.

TABLE 3

Types of Phosphate Ester-based Surfactants

| Phosphate Ester-based Surfactant | Aliphatic alcohol alkoxylate or Aliphatic alcohol | Carbon number of the aliphatic site | Number of added moles of EO | Molecular weight |
|---|---|---|---|---|
| 1 | Aliphatic alcohol alkoxylate 1 | 18 | 3 | 480.7 |
| 2 | Aliphatic alcohol alkoxylate 2 | 18 | 5 | 568.8 |
| 3 | Aliphatic alcohol alkoxylate 3 | 12 | 5 | 486.7 |
| 4 | Aliphatic alcohol alkoxylate 4 | 10 | 5 | 458.6 |
| 5 | Aliphatic alcohol alkoxylate 5 | 24 | 5 | 655.0 |
| 6 | Aliphatic alcohol alkoxylate 6 | 26 | 5 | 683.1 |
| 7 | Aliphatic alcohol alkoxylate 7 | 18 | 1 | 394.6 |
| 8 | Stearyl alcohol | 18 | 0 | 350.5 |
| 9 | Aliphatic alcohol alkoxylate 8 | 18 | 10 | 791.1 |
| 10 | Aliphatic alcohol alkoxylate 9 | 18 | 11 | 835.2 |
| 11 | Aliphatic alcohol alkoxylate 10 | 16 | 5 | 542.8 |

TABLE 3-continued

| Types of Phosphate Ester-based Surfactants | | | | |
|---|---|---|---|---|
| Phosphate Ester-based Surfactant | Aliphatic alcohol alkoxylate or Aliphatic alcohol | Carbon number of the aliphatic site | Number of added moles of EO | Molecular weight |
| 12 | Aliphatic alcohol alkoxylate 11 | 20 | 5 | 598.9 |
| 13 | Aliphatic alcohol alkoxylate 12 | 18 | 5 | 570.8 |
| 14 | Aliphatic alcohol alkoxylate 13 | 18 | 5 | 566.8 |

Production of Sulfate Ester-based Surfactant

The aliphatic alcohol alkoxylate 1 was loaded into a flask including a stirring device, a nitrogen gas-introducing tube, a reflux condenser and a temperature gauge under a nitrogen atmosphere. 90% sulfuric acid was added dropwise to the flask, followed by stirring at 80° ° C. for 2 hours. Further, the temperature was increased to 120° C. and the mixture was subjected to a reaction for 5 hours. Thus, a sulfate ester-based surfactant was obtained. The numbers of carbon atoms of an aliphatic moiety was 18, and the number of moles added of ethylene oxide was 3.

Preparation of Ink

Inks 1 to 55

Respective components (unit: %) shown in the middle section of each of Tables 4-1 to 4-6 were mixed and sufficiently stirred. After that, the mixture was filtered with a polypropylene filter having a pore size of 1.0 μm (manufactured by Advantec Toyo Kaisha, Ltd.) under pressure to prepare each of the inks. The characteristics of the inks are shown in the lower section of each of Tables 4-1 to 4-6. The pH of each of the prepared inks was adjusted with a 0.5 mol/L sulfuric acid aqueous solution so as to fall within a range of from 8.5 to 9.0. In Tables 4-1 to 4-6, the term “ACETYLENOL E60” is the product name of a nonionic acetylene glycol-based surfactant (manufactured by Kawaken Fine Chemicals Co., Ltd.), and the term “Proxel GXL” is the product name of an antiseptic (manufactured by Arch Chemicals, Inc.). The numerical value appended to each amine compound represents the molecular weight thereof.

TABLE 4-1

| Compositions and characteristics of inks | Ink | | | | | | | | | |
|---|---|---|---|---|---|---|---|---|---|---|
| | 1 | 2 | 3 | 4 | 5 | 6 | 7 | 8 | 9 | 10 |
| Type of Pigment dispersion liquid | 1 | 2 | 3 | 4 | 5 | 6 | 7 | 1 | 1 | 1 |
| Type of wax particle | 1 | 1 | 1 | 1 | 1 | 1 | 1 | 2 | 3 | 4 |
| Type of Phosphate Ester-based Surfactants | 1 | 1 | 1 | 1 | 1 | 1 | 1 | 1 | 1 | 1 |
| Pigment dispersion liquid | 30.00 | 30.00 | 30.00 | 30.00 | 30.00 | 30.00 | 30.00 | 30.00 | 30.00 | 30.00 |
| Aqueous dispersion liquid of wax particle | 1.00 | 1.00 | 1.00 | 1.00 | 1.00 | 1.00 | 1.00 | 1.00 | 1.00 | 1.00 |
| Aqueous dispersion liquid of acrylic resin particle | | | | | | | | | | |
| Phosphate Ester-based Surfactants | 0.50 | 0.50 | 0.50 | 0.50 | 0.50 | 0.50 | 0.50 | 0.50 | 0.50 | 0.50 |
| Sulfate Ester-based | | | | | | | | | | |
| Oleic acid | | | | | | | | | | |
| Triethanolamine (149.2) | 0.30 | 0.30 | 0.30 | 0.30 | 0.30 | 0.30 | 0.30 | 0.30 | 0.30 | 0.30 |
| Diethanolamine (105.1) | | | | | | | | | | |
| Tripropanolamine (191.3) | | | | | | | | | | |
| Tris(hydroxymethyl)aminomethane (107.1) | | | | | | | | | | |
| Triethylamine (101.2) | | | | | | | | | | |
| Ethylenediaminetetraacetic acid (292.2) | | | | | | | | | | |
| 10% sodium hydroxide aqueous solution | | | | | | | | | | |
| Calcium carbonate | | | | | | | | | | |
| Glycerin | 10.00 | 10.00 | 10.00 | 10.00 | 10.00 | 10.00 | 10.00 | 10.00 | 10.00 | 10.00 |
| 1,2-Hexanediol | 5.00 | 5.00 | 5.00 | 5.00 | 5.00 | 5.00 | 5.00 | 5.00 | 5.00 | 5.00 |
| Triethylene Glycol | 5.00 | 5.00 | 5.00 | 5.00 | 5.00 | 5.00 | 5.00 | 5.00 | 5.00 | 5.00 |
| ACETYLENOL E60 | 0.50 | 0.50 | 0.50 | 0.50 | 0.50 | 0.50 | 0.50 | 0.50 | 0.50 | 0.50 |
| Proxel GXL | 0.20 | 0.20 | 0.20 | 0.20 | 0.20 | 0.20 | 0.20 | 0.20 | 0.20 | 0.20 |
| Ion-exchanged water | 47.50 | 47.50 | 47.50 | 47.50 | 47.50 | 47.50 | 47.50 | 47.50 | 47.50 | 47.50 |
| Value of $DW_{50}/DP_{50}$ (times) | 0.62 | 0.33 | 0.33 | 0.33 | 0.62 | 0.62 | 0.47 | 1.9 | 1.5 | 1.5 |
| Total content of wax and dispersant for dispersing wax W(%) | 0.10 | 0.10 | 0.10 | 0.10 | 0.10 | 0.10 | 0.10 | 0.10 | 0.10 | 0.10 |
| Content of pigment P(%) | 3.00 | 3.00 | 3.00 | 3.00 | 3.00 | 3.00 | 3.00 | 3.00 | 3.00 | 3.00 |
| Value of W/P (times) | 0.03 | 0.03 | 0.03 | 0.03 | 0.03 | 0.03 | 0.03 | 0.03 | 0.03 | 0.03 |
| Content of amine compound (mol %)/Content of certain phosphate ester-based surfactants (mol %) (times) | 1.9 | 1.9 | 1.9 | 1.9 | 1.9 | 1.9 | 1.9 | 1.9 | 1.9 | 1.9 |

TABLE 4-2

| Compositions and characteristics of inks | | | | | | | | | | |
|---|---|---|---|---|---|---|---|---|---|---|
| | Ink | | | | | | | | | |
| | 11 | 12 | 13 | 14 | 15 | 16 | 17 | 18 | 19 | 20 |
| Type of Pigment dispersion liquid | 1 | 1 | 11 | 13 | 1 | 1 | 1 | 1 | 1 | 1 |
| Type of wax particle | 5 | 6 | 7 | 8 | 1 | 1 | 1 | 1 | 1 | 1 |
| Type of Phosphate Ester-based Surfactants | 1 | 1 | 1 | 1 | 2 | 1 | 1 | 1 | 1 | 1 |
| Pigment dispersion liquid | 30.00 | 30.00 | 30.00 | 30.00 | 30.00 | 30.00 | 30.00 | 30.00 | 30.00 | 30.00 |
| Aqueous dispersion liquid of wax particle | 1.00 | 1.00 | 1.00 | 1.00 | 1.00 | 0.15 | 0.12 | 6.00 | 6.30 | 1.00 |
| Aqueous dispersion liquid of acrylic resin particle | | | | | | | | | | |
| Phosphate Ester-based Surfactants | 0.50 | 0.50 | 0.50 | 0.50 | 0.50 | 0.50 | 0.50 | 0.50 | 0.50 | 0.50 |
| Sulfate Ester-based surfactants | | | | | | | | | | |
| Oleic acid | | | | | | | | | | |
| Triethanolamine (149.2) | 0.30 | 0.30 | 0.30 | 0.30 | 0.30 | 0.30 | 0.30 | 0.30 | 0.30 | 0.16 |
| Diethanolamine (105.1) | | | | | | | | | | |
| Tripropanolamine (191.3) | | | | | | | | | | |
| Tris(hydroxymethyl)aminomethane (107.1) | | | | | | | | | | |
| Triethylamine (101.2) | | | | | | | | | | |
| Ethylenediaminetetraacetic acid (292.2) | | | | | | | | | | |
| 10% sodium hydroxide aqueous solution | | | | | | | | | | |
| Calcium carbonate | | | | | | | | | | |
| Glycerin | 10.00 | 10.00 | 10.00 | 10.00 | 10.00 | 10.00 | 10.00 | 10.00 | 10.00 | 10.00 |
| 1,2-Hexanediol | 5.00 | 5.00 | 5.00 | 5.00 | 5.00 | 5.00 | 5.00 | 5.00 | 5.00 | 5.00 |
| Triethylene Glycol | 5.00 | 5.00 | 5.00 | 5.00 | 5.00 | 5.00 | 5.00 | 5.00 | 5.00 | 5.00 |
| ACETYLENOL E60 | 0.50 | 0.50 | 0.50 | 0.50 | 0.50 | 0.50 | 0.50 | 0.50 | 0.50 | 0.50 |
| Proxel GXL | 0.20 | 0.20 | 0.20 | 0.20 | 0.20 | 0.20 | 0.20 | 0.20 | 0.20 | 0.20 |
| Ion-exchanged water | 47.50 | 47.50 | 47.50 | 47.50 | 47.50 | 48.35 | 48.38 | 42.50 | 42.20 | 47.64 |
| Value of $DW_{50}/DP_{50}$ (times) | 1.5 | 1.5 | 2.0 | 0.10 | 0.62 | 0.62 | 0.62 | 0.62 | 0.62 | 0.62 |
| Total content of wax and dispersant for dispersing wax W(%) | 0.10 | 0.10 | 0.10 | 0.10 | 0.10 | 0.02 | 0.01 | 0.60 | 0.63 | 0.10 |
| Content of pigment P(%) | 3.00 | 3.00 | 3.00 | 3.00 | 3.00 | 3.00 | 3.00 | 3.00 | 3.00 | 3.00 |
| Value of W/P (times) | 0.03 | 0.03 | 0.03 | 0.03 | 0.03 | 0.01 | 0.00 | 0.20 | 0.21 | 0.03 |
| Content of amine compound (mol %)/Content of certain phosphate ester-based surfactants (mol %) (times) | 1.9 | 1.9 | 1.9 | 1.9 | 2.3 | 1.9 | 1.9 | 1.9 | 1.9 | 1.0 |

TABLE 4-3

| Compositions and characteristics of inks | | | | | | | | | | |
|---|---|---|---|---|---|---|---|---|---|---|
| | Ink | | | | | | | | | |
| | 21 | 22 | 23 | 24 | 25 | 26 | 27 | 28 | 29 | 30 |
| Type of Pigment dispersion liquid | 1 | 1 | 1 | 8 | 9 | 10 | 1 | 1 | 1 | 1 |
| Type of wax particle | 1 | 1 | 1 | 1 | 1 | 1 | 9 | 10 | 11 | 1 |
| Type of Phosphate Ester-based Surfactants | 1 | 1 | 1 | 1 | 1 | 1 | 1 | 1 | 1 | 1 |
| Pigment dispersion liquid | 30.00 | 30.00 | 30.00 | 30.00 | 30.00 | 30.00 | 30.00 | 30.00 | 30.00 | 30.00 |
| Aqueous dispersion liquid of wax particle | 1.00 | 1.00 | 1.00 | 1.00 | 1.00 | 1.00 | 1.00 | 1.00 | 1.00 | 1.00 |
| Aqueous dispersion liquid of acrylic resin particle | | | | | | | | | | |
| Phosphate Ester-based Surfactants | 0.50 | 0.50 | 0.50 | 0.50 | 0.50 | 0.50 | 0.50 | 0.50 | 0.50 | 0.50 |
| Sulfate Ester-based surfactants | | | | | | | | | | |
| Oleic acid | | | | | | | | | | |
| Triethanolamine (149.2) | 0.14 | 0.78 | 0.79 | 0.30 | 0.30 | 0.30 | 0.30 | 0.30 | 0.30 | |
| Diethanolamine (105.1) | | | | | | | | | | |
| Tripropanolamine (191.3) | | | | | | | | | | |
| Tris(hydroxymethyl)aminomethane (107.1) | | | | | | | | | | |

TABLE 4-3-continued

| Compositions and characteristics of inks | | | | | | | | | | |
|---|---|---|---|---|---|---|---|---|---|---|
| | Ink | | | | | | | | | |
| | 21 | 22 | 23 | 24 | 25 | 26 | 27 | 28 | 29 | 30 |
| Triethylamine (101.2) | | | | | | | | | | 0.30 |
| Ethylenediaminetetraacetic acid (292.2) | | | | | | | | | | |
| 10% sodium hydroxide aqueous solution | | | | | | | | | | |
| Calcium carbonate | | | | | | | | | | |
| Glycerin | 10.00 | 10.00 | 10.00 | 10.00 | 10.00 | 10.00 | 10.00 | 10.00 | 10.00 | 10.00 |
| 1,2-Hexanediol | 5.00 | 5.00 | 5.00 | 5.00 | 5.00 | 5.00 | 5.00 | 5.00 | 5.00 | 5.00 |
| Triethylene Glycol | 5.00 | 5.00 | 5.00 | 5.00 | 5.00 | 5.00 | 5.00 | 5.00 | 5.00 | 5.00 |
| ACETYLENOL E60 | 0.50 | 0.50 | 0.50 | 0.50 | 0.50 | 0.50 | 0.50 | 0.50 | 0.50 | 0.50 |
| Proxel GXL | 0.20 | 0.20 | 0.20 | 0.20 | 0.20 | 0.20 | 0.20 | 0.20 | 0.20 | 0.20 |
| Ion-exchanged water | 47.66 | 47.02 | 47.01 | 47.50 | 47.50 | 47.50 | 47.50 | 47.50 | 47.50 | 47.50 |
| Value of $DW_{50}/DP_{50}$ (times) | 0.62 | 0.62 | 0.62 | 0.62 | 0.62 | 0.62 | 1.5 | 1.5 | 1.5 | 0.62 |
| Total content of wax and dispersant for dispersing wax W(%) | 0.10 | 0.10 | 0.10 | 0.10 | 0.10 | 0.10 | 0.10 | 0.10 | 0.10 | 0.10 |
| Content of pigment P(%) | 3.00 | 3.00 | 3.00 | 3.00 | 3.00 | 3.00 | 3.00 | 3.00 | 3.00 | 3.00 |
| Value of W/P (times) | 0.03 | 0.03 | 0.03 | 0.03 | 0.03 | 0.03 | 0.03 | 0.03 | 0.03 | 0.03 |
| Content of amine compound (mol %)/Content of certain phosphate ester-based surfactants (mol %) (times) | 0.9 | 5.0 | 5.1 | 1.9 | 1.9 | 1.9 | 1.9 | 1.9 | 1.9 | 2.9 |

TABLE 4-4

| Compositions and characteristics of inks | | | | | | | | | | |
|---|---|---|---|---|---|---|---|---|---|---|
| | Ink | | | | | | | | | |
| | 31 | 32 | 33 | 34 | 35 | 36 | 37 | 38 | 39 | 40 |
| Type of Pigment dispersion liquid | 1 | 1 | 1 | 1 | 1 | 1 | 1 | 1 | 1 | 1 |
| Type of wax particle | 1 | 1 | 1 | 1 | 1 | 1 | 1 | 1 | 1 | 1 |
| Type of Phosphate Ester-based Surfactants | 1 | 3 | 4 | 5 | 6 | 7 | 9 | 10 | 11 | 12 |
| Pigment dispersion liquid | 30.00 | 30.00 | 30.00 | 30.00 | 30.00 | 30.00 | 30.00 | 30.00 | 30.00 | 30.00 |
| Aqueous dispersion liquid of wax particle | 1.00 | 1.00 | 1.00 | 1.00 | 1.00 | 1.00 | 1.00 | 1.00 | 1.00 | 1.00 |
| Aqueous dispersion liquid of acrylic resin particle | | | | | | | | | | |
| Phosphate Ester-based Surfactants | 0.50 | 0.50 | 0.50 | 0.50 | 0.50 | 0.50 | 0.50 | 0.50 | 0.50 | 0.50 |
| Sulfate Ester-based surfactants | | | | | | | | | | |
| Oleic acid | | | | | | | | | | |
| Triethanolamine (149.2) | | 0.30 | 0.30 | 0.30 | 0.30 | 0.30 | 0.30 | 0.30 | 0.30 | 0.30 |
| Diethanolamine (105.1) | | | | | | | | | | |
| Tripropanolamine (191.3) | | | | | | | | | | |
| Tris(hydroxymethyl)aminomethane (107.1) | | | | | | | | | | |
| Triethylamine (101.2) | | | | | | | | | | |
| Ethylenediaminetetraacetic acid (292.2) | 0.30 | | | | | | | | | |
| 10% sodium hydroxide aqueous solution | | | | | | | | | | |
| Calcium carbonate | | | | | | | | | | |
| Glycerin | 10.00 | 10.00 | 10.00 | 10.00 | 10.00 | 10.00 | 10.00 | 10.00 | 10.00 | 10.00 |
| 1,2-Hexanediol | 5.00 | 5.00 | 5.00 | 5.00 | 5.00 | 5.00 | 5.00 | 5.00 | 5.00 | 5.00 |
| Triethylene Glycol | 5.00 | 5.00 | 5.00 | 5.00 | 5.00 | 5.00 | 5.00 | 5.00 | 5.00 | 5.00 |
| ACETYLENOL E60 | 0.50 | 0.50 | 0.50 | 0.50 | 0.50 | 0.50 | 0.50 | 0.50 | 0.50 | 0.50 |
| Proxel GXL | 0.20 | 0.20 | 0.20 | 0.20 | 0.20 | 0.20 | 0.20 | 0.20 | 0.20 | 0.20 |
| Ion-exchanged water | 47.50 | 47.50 | 47.50 | 47.50 | 47.50 | 47.50 | 47.50 | 47.50 | 47.50 | 47.50 |
| Value of $DW_{50}/DP_{50}$ (times) | 0.62 | 0.62 | 0.62 | 0.62 | 0.62 | 0.62 | 0.62 | 0.62 | 0.62 | 0.62 |
| Total content of wax and dispersant for dispersing wax W(%) | 0.10 | 0.10 | 0.10 | 0.10 | 0.10 | 0.10 | 0.10 | 0.10 | 0.10 | 0.10 |

TABLE 4-4-continued

| Compositions and characteristics of inks | | | | | | | | | | |
|---|---|---|---|---|---|---|---|---|---|---|
| | Ink | | | | | | | | | |
| | 31 | 32 | 33 | 34 | 35 | 36 | 37 | 38 | 39 | 40 |
| Content of pigment P(%) | 3.00 | 3.00 | 3.00 | 3.00 | 3.00 | 3.00 | 3.00 | 3.00 | 3.00 | 3.00 |
| Value of W/P (times) | 0.03 | 0.03 | 0.03 | 0.03 | 0.03 | 0.03 | 0.03 | 0.03 | 0.03 | 0.03 |
| Content of amine compound (mol %)/Content of certain phosphate ester-based surfactants (mol %) (times) | 1.0 | 2.0 | 1.8 | 2.6 | 2.7 | 1.6 | 3.2 | 3.4 | 2.2 | 2.4 |

TABLE 4-5

| Compositions and characteristics of inks | | | | | | | | | | |
|---|---|---|---|---|---|---|---|---|---|---|
| | Ink | | | | | | | | | |
| | 41 | 42 | 43 | 44 | 45 | 46 | 47 | 48 | 49 | 50 |
| Type of Pigment dispersion liquid | 1 | 1 | 1 | 1 | 1 | 8 | 15 | 1 | 1 | 12 |
| Type of wax particle | 1 | 1 | 1 | 1 | 1 | 9 | 1 | — | — | 7 |
| Type of Phosphate Ester-based Surfactants | 13 | 14 | 1 | 1 | 1 | 4 | 1 | 1 | 1 | 1 |
| Pigment dispersion liquid | 30.00 | 30.00 | 30.00 | 30.00 | 30.00 | 30.00 | 30.00 | 30.00 | 30.00 | 30.00 |
| Aqueous dispersion liquid of wax particle | 1.00 | 1.00 | 1.00 | 1.00 | 1.00 | 6.30 | 1.00 | 0.00 | 0.00 | 1.00 |
| Aqueous dispersion liquid of acrylic resin particle | | | | | | | | | 1.00 | |
| Phosphate Ester-based Surfactants | 0.50 | 0.50 | 0.50 | 0.50 | 0.50 | 0.50 | 0.50 | 0.50 | 0.50 | 0.50 |
| Sulfate Ester-based surfactants | | | | | | | | | | |
| Oleic acid | | | | | | | | | | |
| Triethanolamine (149.2) | 0.30 | 0.30 | | | | | 0.30 | 0.30 | 0.30 | 0.30 |
| Diethanolamine (105.1) | | | | 0.30 | | | | | | |
| Tripropanolamine (191.3) | | | | | 0.30 | | | | | |
| Tris(hydroxymethyl)aminomethane (107.1) | | | 0.30 | | | | | | | |
| Triethylamine (101.2) | | | | | | 0.56 | | | | |
| Ethylenediaminetetraacetic acid (292.2) | | | | | | | | | | |
| 10% sodium hydroxide aqueous solution | | | | | | | | | | |
| Calcium carbonate | | | | | | | | | | |
| Glycerin | 10.00 | 10.00 | 10.00 | 10.00 | 10.00 | 10.00 | 10.00 | 10.00 | 10.00 | 10.00 |
| 1,2-Hexanediol | 5.00 | 5.00 | 5.00 | 5.00 | 5.00 | 5.00 | 5.00 | 5.00 | 5.00 | 5.00 |
| Triethylene Glycol | 5.00 | 5.00 | 5.00 | 5.00 | 5.00 | 5.00 | 5.00 | 5.00 | 5.00 | 5.00 |
| ACETYLENOL E60 | 0.50 | 0.50 | 0.50 | 0.50 | 0.50 | 0.50 | 0.50 | 0.50 | 0.50 | 0.50 |
| Proxel GXL | 0.20 | 0.20 | 0.20 | 0.20 | 0.20 | 0.20 | 0.20 | 0.20 | 0.20 | 0.20 |
| Ion-exchanged water | 47.50 | 47.50 | 47.50 | 47.50 | 47.50 | 41.94 | 47.50 | 48.50 | 47.50 | 47.50 |
| Value of $DW_{50}/DP_{50}$ (times) | 0.62 | 0.62 | 0.62 | 0.62 | 0.62 | 1.5 | 0.62 | — | — | 2.1 |
| Total content of wax and dispersant for dispersing wax W(%) | 0.10 | 0.10 | 0.10 | 0.10 | 0.10 | 0.63 | 0.10 | 0.00 | 0.00 | 0.10 |
| Content of pigment P(%) | 3.00 | 3.00 | 3.00 | 3.00 | 3.00 | 3.00 | 3.00 | 3.00 | 3.00 | 3.00 |
| Value of W/P (times) | 0.03 | 0.03 | 0.03 | 0.03 | 0.03 | 0.21 | 0.03 | 0.00 | 0.00 | 0.03 |
| Content of amine compound (mol %)/Content of certain phosphate ester-based surfactants (mol %) (times) | 2.3 | 2.3 | 2.7 | 2.7 | 1.5 | 5.1 | 1.9 | 1.9 | 1.9 | 1.9 |

TABLE 4-6

| Compositions and characteristics of inks | | | | | | | | |
|---|---|---|---|---|---|---|---|---|
| | Ink | | | | | | | |
| | 51 | 52 | 53 | 54 | 55 | 56 | 57 | 58 |
| Type of Pigment dispersion liquid | 14 | 1 | 1 | 1 | 1 | 1 | 1 | 1 |
| Type of wax particle | 8 | 1 | 1 | 1 | 1 | 1 | 1 | 1 |
| Type of Phosphate Ester-based Surfactants | 1 | — | 8 | — | — | 1 | 1 | 1 |
| Pigment dispersion liquid | 30.00 | 30.00 | 30.00 | 30.00 | 30.00 | 30.00 | 30.00 | 30.00 |
| Aqueous dispersion liquid of wax particle | 1.00 | 1.00 | 1.00 | 1.00 | 1.00 | 1.00 | 1.00 | 1.00 |
| Aqueous dispersion liquid of acrylic resin particle | | | | | | | | |
| Phosphate Ester-based Surfactants | 0.50 | | 0.50 | | | 0.50 | 0.50 | 0.50 |
| Sulfate Ester-based surfactants | | | | 0.50 | | | | |
| Oleic acid | | | | | 0.50 | | | |
| Triethanolamine (149.2) | 0.30 | 0.30 | 0.30 | 0.30 | 0.30 | | | |
| Diethanolamine (105.1) | | | | | | | | |
| Tripropanolamine (191.3) | | | | | | | | |
| Tris(hydroxymethyl)aminomethane (107.1) | | | | | | | | |
| Triethylamine (101.2) | | | | | | | | |
| Ethylenediaminetetraacetic acid (292.2) | | | | | | | | |
| 10% sodium hydroxide aqueous solution | | | | | | | 0.30 | |
| Calcium carbonate | | | | | | | | 0.30 |
| Glycerin | 10.00 | 10.00 | 10.00 | 10.00 | 10.00 | 10.00 | 10.00 | 10.00 |
| 1,2-Hexanediol | 5.00 | 5.00 | 5.00 | 5.00 | 5.00 | 5.00 | 5.00 | 5.00 |
| Triethylene Glycol | 5.00 | 5.00 | 5.00 | 5.00 | 5.00 | 5.00 | 5.00 | 5.00 |
| ACETYLENOL E60 | 0.50 | 0.50 | 0.50 | 0.50 | 0.50 | 0.50 | 0.50 | 0.50 |
| Proxel GXL | 0.20 | 0.20 | 0.20 | 0.20 | 0.20 | 0.20 | 0.20 | 0.20 |
| Ion-exchanged water | 47.50 | 48.00 | 47.50 | 47.50 | 47.50 | 47.80 | 47.50 | 47.50 |
| Value of $DW_{50}/DP_{50}$ (times) | 0.09 | 0.62 | 0.62 | 0.62 | 0.62 | 0.62 | 0.62 | 0.62 |
| Total content of wax and dispersant for dispersing wax W(%) | 0.10 | 0.10 | 0.10 | 0.10 | 0.10 | 0.10 | 0.10 | 0.10 |
| Content of pigment P(%) | 3.00 | 3.00 | 3.00 | 3.00 | 3.00 | 3.00 | 3.00 | 3.00 |
| Value of W/P (times) | 0.03 | 0.03 | 0.03 | 0.03 | 0.03 | 0.03 | 0.03 | 0.03 |
| Content of amine compound (mol %)/Content of certain phosphate ester-based surfactants (mol %) (times) | 1.9 | — | — | — | — | 0.0 | 0.0 | 0.0 |

(Ink 59)

An ink 59 being a cyan ink was prepared in accordance with a preparation method of Example 1 described in Japanese Patent Application Laid-Open No. 2015-168805. In the prepared ink 59, the average particle diameter of wax ($DW_{50}$) was 160 nm, and the average particle diameter of a pigment ($DP_{50}$) was 120 nm. In addition, the value of average particle diameter of wax ($DW_{50}$)/average particle diameter of pigment ($DP_{50}$) was 1.33. The ink 59 is an ink free of a phosphate ester-based surfactant.

Ink 60

An ink 60 being a black ink was prepared in accordance with a preparation method of Example 1 described in U.S. Pat. No. 10,829,658. In the prepared ink 60, the value of average particle diameter of a wax ($DW_{50}$)/average particle diameter of pigment (DP 50) was set to be equal to the value of average particle diameter of wax ($DW_{50}$)/average particle diameter of pigment ($DP_{50}$) in the ink 1. The ink 60 is an ink free of an amine compound.

Evaluation

Each of the prepared inks was filled into an ink cartridge, and the ink cartridge was set in an ink jet recording apparatus (product name: "PIXUS PRO-10S" (manufactured by Canon Inc.)) having mounted thereon a recording head that ejects an ink by heat energy. In Examples of the present invention, an image recorded under such a condition that one droplet of an ink having a weight of 30 ng per droplet was applied to a unit region measuring 1/600 inch by 1/600 inch was defined as having a recording duty of 100%. In the present invention, in the evaluation criteria of each of the following evaluation items, while levels "AA", "A" and "B" were defined as acceptable levels, a level "C" was defined as an unacceptable level. The evaluation results are shown in Tables 6-1 and 6-2.

Abrasion Resistance

A solid image (measuring 200 mm by 200 mm) having a recording duty of 100% was recorded on a recording medium (product name: "Canon Photo Paper, Glossy Gold GL-101", manufactured by Canon Inc.) with the above-mentioned ink jet recording apparatus. The recorded image was dried at 25° C. for 24 hours, and then a friction test under the conditions of 30 reciprocations and 60 reciprocations under a load of 500 g was performed with Gakushin-Type Tester (product name "AB-301 Color Fastness Rubbing Tester", manufactured by TESTER SANGYO Co,.

Ltd.) in conformity with JIS L 0849:2013. An image after the friction test was visually observed, and the abrasion resistance of the image was evaluated in accordance with the following evaluation criteria.

AA: No abrasion mark was observed on the image even after 60 reciprocations.

A: No abrasion mark was observed on the image even after 30 reciprocations, but there were abrasion marks after 60 reciprocations.

B: Abrasion marks were observed on the image after 30 reciprocations, but the blank area of the recording medium under the image was not visible.

C: Abrasion marks were observed on the image after 30 reciprocations, and the blank area of the recording medium under the image was also visible.

Color Developability 15 kinds of solid images in which the recording duty was changed in 10% increments between 0% to 140% were recorded on recording mediums (product name: "Canon Photo Paper, Glossy Gold GL-101", manufactured by Canon Inc.) with the above-mentioned ink jet recording apparatus. Each of the recorded images was dried at 25° ° C. for 24 hours, and then the optical density of the image was measured with a fluorescence spectrodensitometer (product name: "FD-7", manufactured by Konica Minolta, Inc.). The measurement conditions were set to a light source $D_{50}$ and a viewing angle of 2°. Of the 15 kinds of solid images, the one having the maximum optical density was selected for evaluation, and the color developability of the image was evaluated in accordance with the evaluation criteria shown in Table 5.

TABLE 5

| Evaluation criteria of color developability | | | | |
|---|---|---|---|---|
| | Optical density | | | |
| Evaluation | Black | Cyan | Magenta | Yellow |
| AA | 2.50 or more | 2.20 or more | 2.25 or more | 1.70 or more |
| A | 2.40 or more to less than 2.50 | 2.15 or more to less than 2.20 | 2.20 or more to less than 2.25 | 1.65 or more to less than 1.70 |
| B | 2.30 or more to less than 2.40 | 2.10 or more to less than 2.15 | 2.15 or more to less than 2.20 | 1.60 or more to less than 1.65 |
| C | Less than 2.30 | Less than 2.10 | Less than 2.15 | Less than 1.60 |

TABLE 6-1

| | | Evaluation result | | |
|---|---|---|---|---|
| | | Ink | Abrasion resistance | Color developability |
| Example | 1 | 1 | AA | AA |
| | 2 | 2 | AA | AA |
| | 3 | 3 | AA | AA |
| | 4 | 4 | AA | AA |
| | 5 | 5 | AA | AA |
| | 6 | 6 | AA | AA |
| | 7 | 7 | A | A |
| | 8 | 8 | AA | AA |
| | 9 | 9 | AA | AA |
| | 10 | 10 | AA | AA |
| | 11 | 11 | AA | AA |
| | 12 | 12 | AA | AA |
| | 13 | 13 | AA | AA |
| | 14 | 14 | AA | AA |
| | 15 | 15 | AA | AA |
| | 16 | 16 | AA | AA |

TABLE 6-1-continued

| | | Evaluation result | | |
|---|---|---|---|---|
| | | Ink | Abrasion resistance | Color developability |
| | 17 | 17 | A | AA |
| | 18 | 18 | AA | AA |
| | 19 | 19 | AA | A |
| | 20 | 20 | AA | AA |
| | 21 | 21 | AA | A |
| | 22 | 22 | AA | AA |
| | 23 | 23 | AA | A |
| | 24 | 24 | A | A |
| | 25 | 25 | A | A |
| | 26 | 26 | A | A |
| | 27 | 27 | A | AA |
| | 28 | 28 | A | AA |
| | 29 | 29 | A | AA |
| | 30 | 30 | AA | B |

TABLE 6-2

| | | Evaluation result | | |
|---|---|---|---|---|
| | | Ink | Abrasion resistance | Color developability |
| Example | 31 | 31 | AA | B |
| | 32 | 32 | A | AA |
| | 33 | 33 | B | AA |
| | 34 | 34 | AA | A |
| | 35 | 35 | AA | B |
| | 36 | 36 | AA | A |
| | 37 | 37 | A | AA |
| | 38 | 38 | B | AA |

TABLE 6-2-continued

| | | Evaluation result | | |
|---|---|---|---|---|
| | | Ink | Abrasion resistance | Color developability |
| | 39 | 39 | A | AA |
| | 40 | 40 | AA | A |
| | 41 | 41 | AA | AA |
| | 42 | 42 | AA | AA |
| | 43 | 43 | A | AA |
| | 44 | 44 | AA | A |
| | 45 | 45 | AA | A |
| | 46 | 46 | B | B |
| Comparative Example | 1 | 47 | A | C |
| | 2 | 48 | C | AA |
| | 3 | 49 | C | AA |
| | 4 | 50 | AA | C |
| | 5 | 51 | C | AA |
| | 6 | 52 | C | AA |
| | 7 | 53 | AA | C |
| | 8 | 54 | C | A |

TABLE 6-2-continued

| | Evaluation result | | |
|---|---|---|---|
| | Ink | Abrasion resistance | Color developability |
| 9 | 55 | C | A |
| 10 | 56 | AA | C |
| 11 | 57 | C | AA |
| 12 | 58 | B | C |
| 13 | 59 | C | B |
| 14 | 60 | AA | C |

Although the evaluation of the abrasion resistance and color developability of Examples 41 was "AA", which was the same as that of Example 1, Example 1 was superior to Example 41.

According to the present invention, there can be provided the aqueous ink for ink jet capable of recording an image excellent in abrasion resistance and color developability. In addition, according to the present invention, an ink cartridge and an ink jet recording method each using the aqueous ink can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-208958, filed Dec. 26, 2022, and Japanese Patent Application No. 2023-201741, filed Nov. 29, 2023, which are hereby incorporated by reference herein in their entirety.

What is claimed is:

1. An aqueous ink for ink jet comprising:

a pigment;

a wax;

a dispersant for dispersing the wax;

a phosphate ester-based surfactant; and an amine compound, wherein the pigment comprises a pigment dispersed through an action of at least one kind selected from the group consisting of: a carboxylic acid group; and a sulfonic acid group, wherein the phosphate ester-based surfactant comprises an aliphatic alcohol alkoxylate moiety, and wherein a ratio of a volume-based 50% cumulative particle diameter of the wax to a volume-based 50% cumulative particle diameter of the pigment is 0.10 times or more to 2.0 times or less.

2. The aqueous ink according to claim 1, wherein a mass ratio of a total content (% by mass) of the wax and the dispersant for dispersing the wax to a content (% by mass) of the pigment is 0.005 times or more to 0.20 times or less.

3. The aqueous ink according to claim 1, wherein a molar ratio of a content (% by mol) of the amine compound to a content (% by mol) of the phosphate ester-based surfactant is 1.0 times or more to 5.0 times or less.

4. The aqueous ink according to claim 1, wherein the pigment comprises a resin-dispersed pigment dispersed with a resin having a carboxylic acid group.

5. The aqueous ink according to claim 1, wherein the wax comprises at least one kind of wax selected from the group consisting of: polyethylene wax; Fischer-Tropsch wax; microcrystalline wax; paraffin wax; ozokerite; and ceresin.

6. The aqueous ink according to claim 1, wherein the amine compound comprises an alkanolamine.

7. The aqueous ink according to claim 1, wherein the phosphate ester-based surfactant comprises a compound represented by the following general formula (1):

(1)

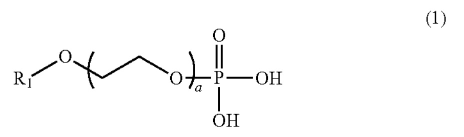

wherein, in the general formula (1), $R_1$ represents a chain hydrocarbon group having 12or more to 24 or less carbon atoms, and "a" represents an integer of 1 or more to 10 or less.

8. The aqueous ink according to claim 1, wherein the phosphate ester-based surfactant comprises a compound represented by the following general formula (2):

(2)

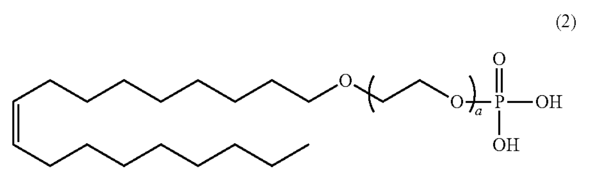

wherein, in the general formula (2), "a" represents an integer of 1 or more to 10 or less.

9. The aqueous ink according to claim 1, wherein the amine compound comprises triethanolamine.

10. An ink cartridge comprising: an ink; and an ink storage portion configured to store the ink, wherein the ink comprises the aqueous ink of claim 1.

11. An ink jet recording method comprising recording an image onto a recording medium by ejecting an ink from a recording head of an ink jet system, wherein the ink comprises the aqueous ink of claim 1.

* * * * *